United States Patent
Zhang

(10) Patent No.: US 9,912,374 B2
(45) Date of Patent: Mar. 6, 2018

(54) FULL-DUPLEX WIRELESS COMMUNICATION METHOD, ANTENNA DEVICE AND FULL-DUPLEX WIRELESS COMMUNICATION SYSTEM

(71) Applicant: University of Science & Technology Beijing, Beijing (CN)

(72) Inventor: Zhongshan Zhang, Beijing (CN)

(73) Assignee: University of Science & Technology Beijing, Beijing (CN)

(*) Notice: Subject to any disclaimer, the term of this patent is extended or adjusted under 35 U.S.C. 154(b) by 154 days.

(21) Appl. No.: 14/957,706

(22) Filed: Dec. 3, 2015

(65) Prior Publication Data
US 2017/0054472 A1 Feb. 23, 2017

(30) Foreign Application Priority Data
Aug. 18, 2015 (CN) .......................... 2015 1 0508994

(51) Int. Cl.
*H04L 5/14* (2006.01)
*H04B 3/23* (2006.01)

(52) U.S. Cl.
CPC ............. *H04B 3/238* (2013.01); *H04L 5/143* (2013.01); *H04L 5/1461* (2013.01)

(58) Field of Classification Search
CPC .................................................... H04B 3/238
See application file for complete search history.

(56) References Cited

U.S. PATENT DOCUMENTS

| | | | | |
|---|---|---|---|---|
| 7,302,231 | B2 * | 11/2007 | Sun | H04B 7/0845 375/E1.032 |
| 8,139,544 | B1 * | 3/2012 | Webster | H04B 7/068 370/203 |
| 8,385,305 | B1 * | 2/2013 | Negus | H04W 76/025 370/310 |
| 9,407,377 | B2 * | 8/2016 | Young | H04B 3/54 |
| 9,609,658 | B2 * | 3/2017 | Maaref | H04W 72/082 |
| 2002/0111143 | A1 * | 8/2002 | Li | H01Q 25/00 455/67.11 |
| 2003/0112787 | A1 * | 6/2003 | Mottier | H04J 13/16 370/342 |
| 2003/0123565 | A1 * | 7/2003 | Fukuda | H04B 7/0613 375/267 |
| 2006/0234752 | A1 * | 10/2006 | Mese | H04L 1/201 455/522 |

(Continued)

*Primary Examiner* — Parth Patel
(74) *Attorney, Agent, or Firm* — Handal & Morofsky LLC

(57) ABSTRACT

The present disclosure provides a full-duplex wireless communication method, an antenna device and a full-duplex wireless communication system. The method includes steps of: within a training period, acquiring a relevant parameter for cancelling a self-interference signal from an antenna itself as a first estimated value, and a relevant parameter for cancelling a cross-interference signal between the antenna and the other antenna as a second estimated value; and within a data transmission period, receiving and transmitting signals simultaneously by the antenna using an identical frequency, cancelling the self-interference signal from the antenna itself in accordance with the first estimated value, and cancelling the cross-interference signal between the antenna and the other antenna in accordance with the second estimated value.

13 Claims, 11 Drawing Sheets

Within a Training Period, Acquiring a Relevant Parameter For Cancelling a Self-Interference Signal from an Antenna Itself as a First Estimated Value, and a Relevant Parameter For Cancelling a Cross-Interference Signal Between the Antenna and the Other Antenna as a Second Estimated Value — 11

Within a Data Transmission Period, Receiving and Transmitting Signals Simultaneously by the Antenna Using an Identical Frequency, Cancelling the Self-Interference Signal from the Antenna Itself in Accordance With the First Estimated Value, and Cancelling the Cross-Interference Signal between the Antenna and the Other Antenna In Accordance With the Second Estimated Value — 12

(56) References Cited

U.S. PATENT DOCUMENTS

| | | | |
|---|---|---|---|
| 2006/0292990 A1* | 12/2006 | Karabinis | H04B 7/18513 455/63.4 |
| 2007/0010203 A1* | 1/2007 | Wee | H04B 1/7103 455/63.1 |
| 2007/0195904 A1* | 8/2007 | Kemenczy | H04L 25/0328 375/262 |
| 2009/0156135 A1* | 6/2009 | Kamizuma | H04B 1/0082 455/73 |
| 2009/0203322 A1* | 8/2009 | Horn | H04W 72/082 455/67.13 |
| 2010/0203912 A1* | 8/2010 | Ashikhmin | H04B 7/0617 455/501 |
| 2011/0143655 A1* | 6/2011 | Ahn | H04B 7/15542 455/9 |
| 2011/0280162 A1* | 11/2011 | Ashikhmin | H04B 7/0617 370/280 |
| 2012/0063529 A1* | 3/2012 | Choi | H04B 7/0891 375/267 |
| 2012/0113910 A1* | 5/2012 | Jen | H04L 1/16 370/329 |
| 2013/0102254 A1* | 4/2013 | Cyzs | H04B 1/126 455/63.1 |
| 2014/0010334 A1* | 1/2014 | Kotzsch | H04B 1/1081 375/347 |
| 2014/0029706 A1* | 1/2014 | Chiu | H04B 1/71055 375/346 |
| 2015/0078281 A1* | 3/2015 | Kishiyama | H04W 48/18 370/329 |
| 2015/0103802 A1* | 4/2015 | Cheng | H04L 5/0048 370/330 |
| 2015/0117327 A1* | 4/2015 | Nordstrom | H04W 72/082 370/329 |
| 2015/0270867 A1* | 9/2015 | Young | H04B 1/7085 375/145 |
| 2016/0226653 A1* | 8/2016 | Bharadia | H04B 1/525 |
| 2016/0233904 A1* | 8/2016 | Wu | H04L 5/16 |
| 2016/0315754 A1* | 10/2016 | Wu | H04L 5/1461 |
| 2016/0329950 A1* | 11/2016 | Khlebnikov | H04B 7/0854 |

* cited by examiner

FULL-DUPLEX WIRELESS COMMUNICATION METHOD, ANTENNA DEVICE AND FULL-DUPLEX WIRELESS COMMUNICATION SYSTEM

CROSS-REFERENCE TO RELATED APPLICATIONS

The present application claims the priority benefit of Chinese Patent Application No. 201510508994.2, filed on Aug. 18, 2015, the contents of which are incorporated herein by reference in its entirety.

TECHNICAL FIELD

The present disclosure relates to the field of communication technology, in particular to a full-duplex wireless communication method, an antenna device and a full-duplex wireless communication system.

BACKGROUND

In order to meet the ever-increasing demand of users on transmission rate, it is required to further improve spectral efficiency of a wireless network. However, an existing wireless communication system usually adopts a half-duplex mode, resulting in a huge waste of resources. A full-duplex mode may receive and transmit signals using an identical frequency simultaneously, so it is able to improve the spectral efficiency of the wireless communication system. In addition, the full-duplex mode is able to provide channel capacity twice as high as the half-duplex mode. However, an interference signal received by a full-duplex device from its own transmitting antenna (i.e., a self-interference signal) has power far larger than a useful signal received thereby, and the system performance of the full-duplex system will be seriously affected by this self-interference signal. In a traditional full-duplex system which receives and transmits signals using an identical frequency simultaneously, the antennae include transmitting antennae which are merely configured to transmit signals and receiving antennae which are merely configured to receive signals. For N antennae, there are at most N/2 spatial diversity gains for the system. For the full-duplex system with such an "antennae partition-based" mode, the spatial diversity gains and the data throughput for the entire system will be halved.

SUMMARY

An object of the present disclosure is to provide a full-duplex wireless communication method, an antenna device and a full-duplex wireless communication system, so as to prevent spatial diversity gains and data throughput from being halved in an existing "antennae partition-based" full-duplex system.

In one aspect, the present disclosure provides in one embodiment a full-duplex wireless communication method, including steps of:

within a training period, acquiring a relevant parameter for cancelling a self-interference signal from an antenna itself as a first estimated value, and a relevant parameter for cancelling a cross-interference signal between the antenna and the other antenna as a second estimated value; and within a data transmission period, receiving and transmitting signals simultaneously by the antenna using an identical frequency, cancelling the self-interference signal from the antenna itself in accordance with the first estimated value, and cancelling the cross-interference signal between the antenna and the other antenna in accordance with the second estimated value.

The step of, within the training period, acquiring the relevant parameter for cancelling the self-interference signal from the antenna itself as the first estimated value, and the relevant parameter for cancelling the cross-interference signal between the antenna and the other antenna as the second estimated value includes:

in one of a plurality of training slots within the training period, transmitting, by the antenna, a predetermined training sequence and receiving the predetermined training sequence transmitted by itself, and in the other training slots, receiving, by the antenna, a predetermined training sequence from the other antenna; and in the training slot, acquiring, by the antenna, the relevant parameter for cancelling the self-interference signal from the antenna itself as the first estimated value in accordance with the predetermined training sequence from the antenna itself, and within the other training slots, acquiring, by the antenna, the relevant parameter for cancelling the cross-interference signal between the antenna and the other antenna as the second estimated value in accordance with the predetermined training sequence from the other antenna.

The step of, in the training slot, acquiring, by the antenna, the relevant parameter for cancelling the self-interference signal from the antenna itself as the first estimated value in accordance with the predetermined training sequence from the antenna itself includes:

in the training slot, performing estimation, by the antenna, on a channel parameter of the self-interference signal at an analog domain in accordance with the predetermined training sequence from the antenna itself so as to obtain a first analog estimated value, and cancelling the self-interference signal from the antenna itself at the analog domain in accordance with the first analog estimated value; and in the training slot, performing estimation, by the antenna, on a channel parameter of a residual self-interference signal at a digital domain in accordance with the residual self-interference signal from the antenna obtained after the analog-domain cancellation so as to obtain a first digital estimated value, and cancelling the residual self-interference signal from the antenna at the digital domain in accordance with the first digital estimated value.

The step of, in the other training slots, acquiring, by the antenna, the relevant parameter for cancelling the cross-interference signal between the antenna and the other antenna as the second estimated value in accordance with the predetermined training sequence from the other antenna includes:

in the other training slots, performing estimation, by the antenna, on a channel parameter of the cross-interference signal between the antenna and the other antenna at the analog domain in accordance with the predetermined training sequence from the other antenna so as to obtain a second analog estimated value, and cancelling the cross-interference signal between the antenna and the other antenna at the analog domain in accordance with the second analog estimated value; and in the other training slots, performing estimation, by the antenna, on a channel parameter of a residual cross-interference signal between the antenna and the other antenna at the digital domain in accordance with the residual cross-interference signal between the antenna and the other antenna obtained after the analog cancellation so as to obtain a second digital estimated value, and cancelling the residual cross-interference signal between the antenna and the other antenna at the digital domain in accordance with the second digital estimated value.

The method further includes steps of:

in the training slot, transmitting, by the antenna, the predetermined training sequence periodically;

performing estimation, by the antenna that receives the predetermined training sequence, on the channel parameter of the self-interference signal from the antenna itself in accordance with the predetermined training sequence so as to obtain a plurality of first candidate estimated values, and performing estimation on the channel parameter of the cross-interference signal between the antenna and the other antenna in accordance with the predetermined training sequence so as to obtain a plurality of second candidate estimated values; and selecting, by the antenna, an estimated value capable of enabling the energy of the residual self-interference signal to be minimum from the plurality of first candidate estimated values as the first estimated value, and selecting an estimated value capable of enabling the energy of the residual cross-interference signal to be minimum from the plurality of second candidate estimated values as the second estimated value.

The step of cancelling, by the antenna, the self-interference signal from the antenna itself in accordance with the first estimated value includes:

within the data transmission period, cancelling, by the antenna, the self-interference signal from the antenna itself at the analog domain in accordance with the first analog estimated value; and cancelling, by the antenna, the residual self-interference signal from the antenna itself obtained after the analog-domain cancellation at the digital domain in accordance with the first digital estimated value.

The step of cancelling, by the antenna, the cross-interference signal between the antenna and the other antenna in accordance with the second estimated value includes:

within the data transmission period, cancelling, by the antenna, the cross-interference signal between the antenna and the other antenna at the analog domain in accordance with the second analog estimated value; and cancelling, by the antenna, the residual cross-interference signal between the antenna and the other antenna obtained after the analog-domain cancellation at the digital domain in accordance with the second digital estimated value.

In the training period, the cancellation step at the analog domain includes:

inverting a phase of an analog signal of the predetermined training sequence from an transmitting antenna, so as to obtain an interference cancellation signal with a phase reverse to the analog signal;

acquiring an interference signal received by a receiving antenna and generated by the predetermined training sequence from the transmitting antenna;

comparing power of the interference cancellation signal and power of the interference signal, and adjusting the power of the interference cancellation signal in accordance with a comparison result, so as to enable a difference between the power of the interference cancellation signal and the power of the interference signal to be minimum; and adding the interference cancellation signal to the interference signal, and adjusting the phase of the interference cancellation signal in accordance with an addition result, so as to enable the phase of the interference cancellation signal to be reverse to the phase of the interference signal and enable signal power obtained after the addition to approximate to be zero, thereby to perform the interference cancellation at the analog domain.

An optimal value is determined, through negative feedback control, from the plurality of candidate estimated values as the first estimated value or the second estimated value, and the optimal value is an estimated value capable of enabling the signal power obtained after the addition to be minimum.

In another aspect, the present disclosure provides in one embodiment an antenna device, including:

a parameter estimation module configured to, within a training period, acquire a relevant parameter for cancelling a self-interference signal from an antenna itself as a first estimated value, and a relevant parameter for cancelling a cross-interference signal between the antenna and the other antenna as a second estimated value; and an interference cancellation module configured to, within a data transmission period, cancel the self-interference signal from the antenna itself in accordance with the first estimated value and cancel the cross-interference signal between the antenna and the other antenna in accordance with the second estimated value when signals are received and transmitted simultaneously by the antenna using an identical frequency.

The parameter estimation module includes:

a training sequence transmission and reception module configured to, in one of a plurality of training slots within the training period, transmit a predetermined training sequence by the antenna itself and receive the predetermined training sequence from the antenna itself, and receive, in the other training slots, a predetermined training sequence from the other antenna; and a parameter estimation sub-module configured to, in the training slot, acquire the relevant parameter for cancelling the self-interference signal from the antenna itself as the first estimated value in accordance with the predetermined training sequence from the antenna itself, and in the other training slots, acquire the relevant parameter for cancelling the cross-interference signal between the antenna and the other antenna as the second estimated value in accordance with the predetermined training sequence from the other antenna.

The parameter estimation sub-module includes:

a first analog estimation unit configured to, in the training slot, perform estimation on a channel parameter of the self-interference signal at an analog domain in accordance with the predetermined training sequence from the antenna itself so as to obtain a first analog estimated value, thereby to cancel the self-interference signal from the antenna itself at the analog domain in accordance with the first analog estimated value; and a first digital estimation unit configured to, in the training slot, perform estimation on a channel parameter of a residual self-interference signal at a digital domain in accordance with the residual self-interference signal from the antenna obtained after the analog-domain cancellation so as to obtain a first digital estimated value, thereby to cancel the residual self-interference signal from the antenna at the digital domain in accordance with the first digital estimated value.

The parameter estimation sub-module further includes:

a second analog estimation unit configured to, in the other training slots, perform estimation on a channel parameter of the cross-interference signal between the antenna and the other antenna at the analog domain in accordance with the predetermined training sequence from the other antenna so as to obtain a second analog estimated value, thereby to cancel the cross-interference signal between the antenna and the other antenna at the analog domain in accordance with the second analog estimated value; and a second digital estimation unit configured to, in the other training slots, performing estimation on a residual cross-interference signal between the antenna and the other antenna at the digital domain in accordance with the residual cross-interference signal between the antenna and the other antenna obtained after the analog cancellation so as to obtain a second digital estimated value, thereby to cancel the residual cross-interference signal between the antenna and the other antenna at the digital domain in accordance with the second digital estimated value.

The sequence transmission and reception module includes a sequence transmission sub-module configured to, in the training slot, transmit the predetermined training sequence periodically.

The parameter estimation sub-module includes:

an estimation unit configured to perform estimation on the channel parameter of the self-interference signal from the antenna itself in accordance with the predetermined training sequence so as to obtain a plurality of first candidate estimated values, and performing estimation on the channel parameter of the cross-interference signal between the antenna and the other antenna in accordance with the predetermined training sequence so as to obtain a plurality of second candidate estimated values; and a selection unit configured to select an estimated value capable of enabling the energy of the residual self-interference signal to be minimum from the plurality of first candidate estimated values as the first estimated value, and select an estimated value capable of enabling the energy of the residual cross-interference signal to be minimum from the plurality of second candidate estimated values as the second estimated value.

The interference cancellation module includes:

a first analog cancellation unit configured to, within the data transmission period, cancel the self-interference signal from the antenna itself at the analog domain in accordance with the first analog estimated value; and a first digital cancellation unit configured to cancel the residual self-interference signal from the antenna itself obtained after the analog-domain cancellation at the digital domain in accordance with the first digital estimated value.

The interference cancellation module further includes:

a second analog cancellation unit configured to, within the data transmission period, cancel the cross-interference signal between the antenna and the other antenna at the analog domain in accordance with the second analog estimated value; and a second digital cancellation unit configured to cancel the residual cross-interference signal between the antenna and the other antenna obtained after the analog-domain cancellation at the digital domain in accordance with the second digital estimated value.

The antenna device further includes:

an inversion module configured to, within the training period, invert a phase of an analog signal of the predetermined training sequence from the antenna, so as to obtain an interference cancellation signal with a phase reverse to the analog signal;

an acquisition module configured to acquire an interference signal generated by the predetermined training sequence;

a power comparison module configured to compare power of the interference cancellation signal and power of the interference signal, and adjust the power of the interference cancellation signal in accordance with a comparison result, so as to enable a difference between the power of the interference cancellation signal and the power of the interference signal to be minimum; and a phase comparison module configured to add the interference cancellation signal to the interference signal, and adjust the phase of the interference cancellation signal in accordance with an addition result, so as to enable the phase of the interference cancellation signal to be reverse to the phase of the interference signal and enable signal power obtained after the addition to approximate to be zero, thereby to perform the interference cancellation at the analog domain.

An optimal value is determined, through negative feedback control, from the plurality of candidate estimated values as the first estimated value or the second estimated value, and the optimal value is an estimated value capable of enabling the signal power obtained after the addition to be minimum.

In yet another aspect, the present disclosure provides in one embodiment a full-duplex wireless communication system including N antenna devices, and N is an integer greater than or equal to 1.

According to the full-duplex wireless communication method, the antenna device and the full-duplex wireless communication system in the embodiments of the present disclosure, in the training period, the relevant parameter for cancelling the self-interference signal from the antenna itself is acquired as the first estimated value, and the relevant parameter for cancelling the cross-interference signal between the antenna and the other antenna is acquired as the second estimated value. Hence, it is able for the antenna device to receive and transmit the signals simultaneously using an identical frequency within the data transmission period, thereby to enable the full-duplex wireless communication system in the embodiments of the present disclosure to double its spatial diversity gains and data throughput as compared with the existing full-duplex wireless communication system. In addition, it is able for the antenna device to cancel the self-interference signal and the cross-interference signal in accordance with the first estimated value and the second estimated value, thereby to improve the performance of the full-duplex wireless communication system.

DETAILED DESCRIPTION

In order to make the objects, the technical solutions and the advantages of the present disclosure more apparent, the present disclosure will be described hereinafter in conjunction with the drawings and embodiments.

For an existing "antennae partition-based" full-duplex wireless communication system, spatial diversity gains and data throughput are halved. In order to overcome this drawback, the present disclosure provides in the embodiments a full-duplex wireless communication method, an antenna device and a full-duplex wireless communication system. In a training period, a first estimated value for cancelling a self-interference signal from an antenna itself and a second estimated value for cancelling a cross-interference signal between the antenna and the other antenna are acquired. Hence, it is able for the antenna device to cancel the self-interference signal and the cross-interference signal in accordance with the first estimated value and the second estimated value within a data transmission period. In addition, it is able for the antenna device to receive and transmit signals simultaneously using an identical frequency, thereby enabling the full-duplex wireless communication system to double its spatial diversity gains and data throughput, and to improve the performance of the full-duplex wireless communication system.

First Embodiment

Figure 1:
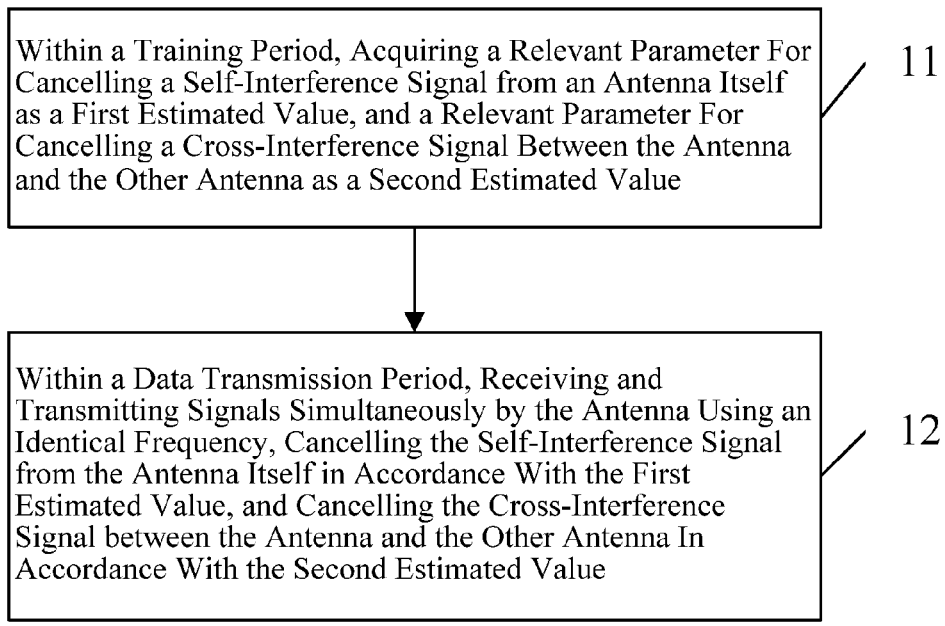
FIG. 1 is a flow chart of a full-duplex wireless communication method according to the first embodiment of the present disclosure.

As shown in FIG. 1, the full-duplex wireless communication method in the first embodiment includes:

Step 11 of, within a training period, acquiring a relevant parameter for cancelling a self-interference signal from an antenna itself as a first estimated value, and a relevant parameter for cancelling a cross-interference signal between the antenna and the other antenna as a second estimated value; and Step 12 of, within a data transmission period, receiving and transmitting signals simultaneously by the antenna using an identical frequency, cancelling the self-interference signal from the antenna itself in accordance with the first estimated value, and cancelling the cross-interference signal between the antenna and the other antenna in accordance with the second estimated value.

A working procedure of the full-duplex wireless communication system includes the training period and the data transmission period. Within the training period, the first estimated value for cancelling the self-interference signal from the antenna itself and the second estimated value for cancelling the cross-interference signal between the antenna and the other antenna are determined. Because the relevant parameter for cancelling the self-interference signal (e.g., phase and power of the self-interference signal) and the relevant parameter for cancelling the cross-interference signal (e.g., phase and power of the cross-interference signal) are invariable within both the training period and the data transmission period, it is unnecessary to perform the complex parameter estimation within the data transmission period, and the first estimated value and the second estimated value may be directly used for the cancellation of the self-interference signal and the cross-interference signal within the data transmission period.

In this embodiment, the antennae is able to receive and transmit the signals simultaneously using an identical frequency, without any need to distinguish between a transmitting antenna and a receiving antenna. When the antenna receives and transmits the signals simultaneously using an identical frequency within the data transmission period, the antenna is able to cancel the self-interference generated during the transmission and reception of the signals, and the cross-interference between the antenna and the other antenna. According to the full-duplex wireless communication method, it is able to provide a full-duplex wireless communication system with a high-performance self-interference cancellation function and capable of receiving and transmitting signals in a co-time, co-frequency and co-array manner. In addition, because the antenna may receive and transmit the signals simultaneously using an identical frequency, it is able to double the spatial diversity gains and the data throughput as compared with the related art.

Second Embodiment

Figure 2:
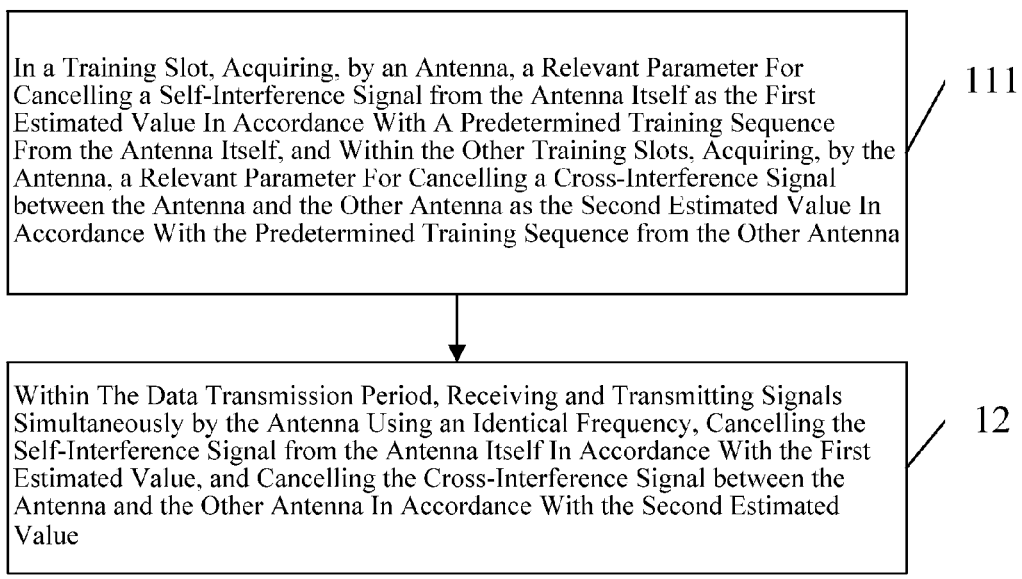
FIG. 2 is another flow chart of the full-duplex wireless communication method according to the second embodiment of the present disclosure.

In the full-duplex wireless communication method as shown in FIG. 2, the training period includes a plurality of training slots, and in one training slot, the antenna transmits a predetermined training sequence and receives the predetermined training sequence from the antenna itself, and in the other training slots, the antenna does not transmit any signal but merely receives predetermined training sequences from other antennae.

The full-duplex wireless communication method in this embodiments includes:

Step 111 of: in the training slot, acquiring, by the antenna, the relevant parameter for cancelling the self-interference signal from the antenna itself as the first estimated value in accordance with the predetermined training sequence from the antenna itself, and within the other training slots, acquiring, by the antenna, the relevant parameter for cancelling the cross-interference signal between the antenna and the other antenna as the second estimated value in accordance with the predetermined training sequence from the other antenna; and Step 12 of, within the data transmission period, receiving and transmitting signals simultaneously by the antenna using an identical frequency, cancelling the self-interference signal from the antenna itself in accordance with the first estimated value, and cancelling the cross-interference signal between the antenna and the other antenna in accordance with the second estimated value.

In the second embodiment, in one training slot, the predetermined training sequence is transmitted by the antenna. Based on an existing mechanism, the predetermined training sequence is present in the form of an analog signal during the transmission and reception, i.e., the predetermined training sequence transmitted and received by the antenna is just the analog signal. This predetermined training sequence is a known sequence, and the antenna may receive the predetermined training sequence from the antenna itself, and acquire the relevant parameter for cancelling the self-interference signal from the antenna itself as the first estimated value in accordance with the received predetermined training sequence from the antenna itself. The relevant parameter usually refers to a channel parameter of the self-interference signal, e.g., phase and power of the self-interference signal. In the other training slots, the antenna may receive the predetermined training sequence from the other antenna (in each training slot, one and only one antenna transmits the predetermined training sequence, and all the antennae, inclusive of the antenna that transmits the predetermined training sequence, may receive the predetermined training sequence in this training slot), and acquire the relevant parameter for cancelling the cross-interference signal between the antenna and the other antenna as the second estimated value in accordance with the predetermined training sequence from the other antenna.

The first estimated value and the second estimated value may be acquired as follows. To be specific, Step 111 of acquiring the first estimated value includes:

Step 1111 of, in the training slot, performing estimation, by the antenna, on a channel parameter of the self-interference signal at an analog domain in accordance with the received predetermined training sequence from the antenna itself so as to obtain a first analog estimated value, and cancelling the self-interference signal from the antenna itself at the analog domain in accordance with the first analog estimated value; and Step 1112 of, in the training slot, performing estimation, by the antenna, on a channel parameter of a residual self-interference signal at a digital domain in accordance with the residual self-interference signal from the antenna obtained after the analog-domain cancellation so as to obtain a first digital estimated value, and cancelling the residual self-interference signal from the antenna at the digital domain in accordance with the first digital estimated value.

In addition, Step 111 of acquiring the second estimated value includes:

Step 1113 of, in the other training slots, performing estimation, by the antenna, on a channel parameter of the cross-interference signal between the antenna and the other antenna at the analog domain in accordance with the received predetermined training sequence from the other antenna so as to obtain a second analog estimated value, and cancelling the cross-interference signal between the antenna and the other antenna at the analog domain in accordance with the second analog estimated value; and Step 1114 of, in the other training slots, performing estimation, by the antenna, on a channel parameter of a residual cross-interference signal between the antenna and the other antenna at the digital domain in accordance with the residual cross-interference signal between the antenna and the other antenna obtained after the analog cancellation so as to obtain a second digital estimated value, and cancelling the residual cross-interference signal between the antenna and the other antenna at the digital domain in accordance with the second digital estimated value.

In this embodiment, the first estimated value includes the first analog estimated value and the first digital estimated value. The antenna may determine the self-interference signal in accordance with the predetermined training sequence from the antenna itself, so as to perform estimation on the self-interference signal at the analog domain, so as to obtain the first analog estimated value. In addition, in order to facilitate the subsequent estimation at the digital domain, it is required to cancel the self-interference signal at the analog domain in accordance with the first analog estimated value, and then perform estimation on the channel parameter of the self-interference signal at the digital domain so as to obtain the first digital estimated value. It should be appreciated that, the transmission and reception of the signal within the data transmission period are not adversely affected by the interference signal in the training period, so it is unnecessary to cancel the self-interference signal at the digital domain after acquiring the first digital estimated value.

Identically, in the other training slots, the antenna may determine the cross-interference signal between the antenna and the other antenna in accordance with the predetermined training sequence from the other antenna, so as to perform estimation on a channel parameter of the cross-interference signal at the analog domain, thereby obtaining the second analog estimated value. In addition, in order to facilitate the subsequent estimation at the digital domain, it is required to cancel the cross-interference signal at the analog domain in accordance with the second analog estimated value, and then perform estimation on a channel parameter of a residual cross-interference signal between the antenna and the other antenna at the digital domain, so as to obtain the second digital estimated value. It should be appreciated that, the transmission and reception of the signal within the data transmission period are not adversely affected by the interference signal in the training period, so it is unnecessary to cancel the residual cross-interference signal at the digital domain after acquiring the second digital estimated value.

In the above embodiment, in order to obtain the stable and accurate first estimated value and second estimated value, the training period for each antenna is an initialization stage for the channel parameter of the antenna. To be specific, the method further includes steps of:

in the training slot, transmitting, by the antenna, the predetermined training sequence periodically;

performing estimation, by the antenna that receives the predetermined training sequence, on the channel parameter of the self-interference signal from the antenna itself in accordance with the predetermined training sequence so as to obtain a plurality of first candidate estimated values, and performing estimation on the channel parameter of the cross-interference signal between the antenna and the other antenna in accordance with the predetermined training sequence so as to obtain a plurality of second candidate estimated values; and selecting an estimated value capable of enabling the energy of the residual self-interference signal to be minimum from the plurality of first candidate estimated values as the first estimated value, and selecting an estimated value capable of enabling the energy of the residual cross-interference signal to be minimum from the plurality of second candidate estimated values as the second estimated value.

Alternatively, an optimal value is determined, through negative feedback control, from the plurality of candidate estimated values as the first estimated value or the second estimation value, and the optimal value is an estimated value capable of enabling the signal power to be minimum after the addition.

Further, Step 12 includes:

Step 121 of, within the data transmission period, cancelling, by the antenna, the self-interference signal from the antenna itself at the analog domain in accordance with the first analog estimated value; and Step 122 of cancelling, by the antenna, the residual self-interference signal from the antenna itself obtained after the analog-domain cancellation at the digital domain in accordance with the first digital estimated value.

In addition, Step 12 further includes:

Step 123 of, within the data transmission period, cancelling, by the antenna, the cross-interference signal between the antenna and the other antenna at the analog domain in accordance with the second analog estimated value; and Step 124 of cancelling, by the antenna, the residual cross-interference signal between the antenna and the other antenna obtained after the analog-domain cancellation at the digital domain in accordance with the second digital estimated value.

Figure 3:
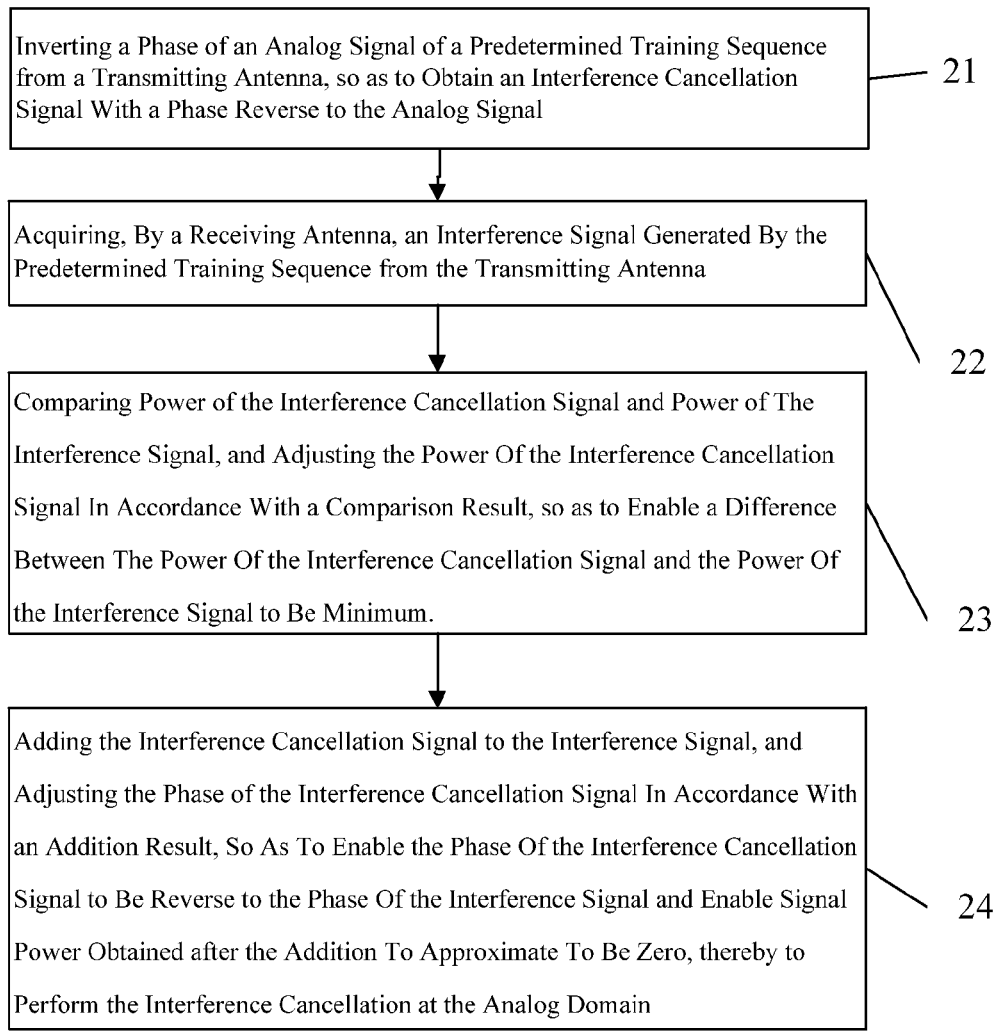
FIG. 3 is a schematic view showing analog-domain cancellation steps for the full-duplex wireless communication method according to one embodiment of the present disclosure.

Further, as shown in FIG. 3, within the training period, the cancellation step at the analog domain includes:

Step 21 of inverting a phase of an analog signal of the predetermined training sequence from a transmitting antenna, so as to obtain an interference cancellation signal with a phase reverse to the analog signal;

Step 22 of acquiring an interference signal received by a receiving antenna and generated by the predetermined training sequence from the transmitting antenna;

Step 23 of comparing power of the interference cancellation signal and power of the interference signal, and adjusting the power of the interference cancellation signal in accordance with a comparison result, so as to enable a difference between the power of the interference cancellation signal and the power of the interference signal to be minimum; and Step 24 of adding the interference cancellation signal to the interference signal, and adjusting the phase of the interference cancellation signal in accordance with an addition result, so as to enable the phase of the interference cancellation signal to be reverse to the phase of the interference signal and enable signal power obtained after the addition to approximate to be zero, thereby to perform the interference cancellation at the analog domain, wherein the transmitting antenna and the receiving antenna may be identical or different; if they are identical, the above interference signal refers to the self-interference signal, otherwise, the above interference signal refers to the cross-interference signal.

Figure 4:
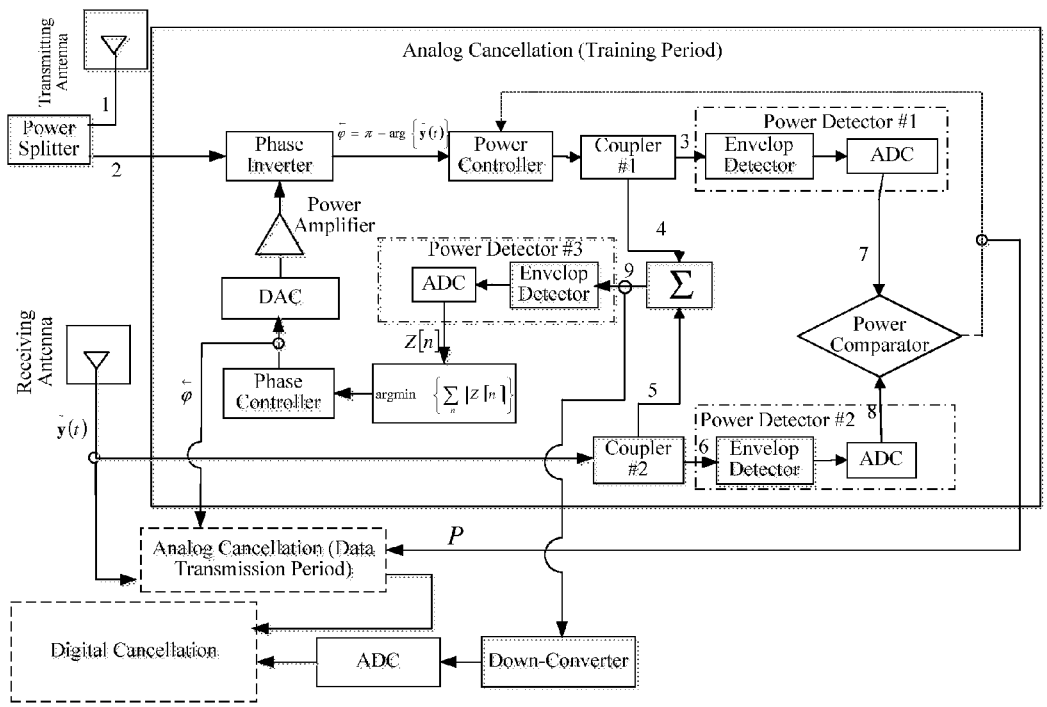
FIG. 4 is a schematic view showing modules and a principle for the analog cancellation used in the full-duplex wireless communication method according to one embodiment of the present disclosure.

To be specific, as shown in FIG. 4, the cancellation step at the analog domain includes the following steps.

At first, a signal transmitted by the antenna is divided by a power splitter into two components (i.e., path 1 and path 2). The power splitter may be any appropriate power divider, power combiner, directional coupler, or any other signal splitter capable of coupling a signal from a full-duplex radio frequency (RF) transmission module to an analog cancellation module.

Signal component "1" is transmitted via an air interface of the antenna, and signal component "2" is used as a reference signal at a receiver antenna for generating an interference cancellation signal. In order to effectively cancel the interference in the received signal, signal component "2" must be sent to a phase inverter so as to be provided with a phase reverse to the interference signal ($\tilde{y}(t)$) received at the receiver antenna.

Next, the reference signal with the inverted phase is sent to a power controller, and then split by a coupler #1 according to a certain proportion and input into two subsequent devices. It should be appreciated that, a power-split proportion at a coupler #2 is identical to that at the coupler #1.

Signal components "3" and "6" are sent to power detectors #1 and #2, respectively, so as to extract power levels and transmit them to a power comparator. A difference between signal components "7" and "8" may trigger the power controller to adaptively adjust the power of signal component "1", so as to eliminate the power difference. The smaller the difference between signal components "7" and "8", the smaller the difference between signal components "4" and "5".

When the difference between signal components "4" and "5" is sufficiently small, it is able to effectively cancel out signal components "4" and "5". The output of an adder (i.e., residual interference signal component "9") is transmitted to a power detector #3. When the output of the power detector #3 (i.e., Z[n]) is not low enough as compared with a background noise level, a phase controller may inform a digital-to-analog converter (DAC) to generate a control voltage for the phase inverter. Then, the phase inverter may adjust the phase of signal component "2" in accordance with the output of a power amplifier, so that the reference signal "2" is of a phase reverse to the self-interference signal $\tilde{y}(t)$.

After performing the above-mentioned procedure iteratively, the phase of the reference signal "2" may gradually be reverse to that of the self-interference signal $\tilde{y}(t)$, which means that the interference cancellation function converges to a steady state. The residual interference signal "9" is output to a down-converter and then to an analog-to-digital converter (ADC), and finally to a digital cancellation module, so as to perform the cancellation at the digital domain.

The principle of the cancellation at the digital domain will be described as follows.

In one training slot, the antenna performs the self-interference cancellation through the analog cancellation first, and then send the residual self-interference signal to the down-converter and the ADC, so as to obtain residual baseband self-interference by sampling, i.e., $y_{m,res} = Ah_{D,m,m} + w$. To be specific, $$y_{m,yes} = [y_{m,res}[0], y_{m,res}[1], \ldots, y_{m,res}[N-1]]^T$$

$$h_{D,m,m} = [I[0], I[1], \ldots, I[k-1]]^T$$

$$A = \begin{bmatrix} I[0] & I[1] & \cdots & I[k-1] \\ \vdots & \vdots & \ddots & \vdots \\ I[N-1] & I[N] & \cdots & I[N+k-1] \end{bmatrix}$$

$$w = [w[0], w[1], \ldots, w[N-1]]^T$$

$h_{D,m,m}$ may be estimated as follows:

$$\hat{h}_{D,m,m} = \arg\min \|y_{m,res} - A\hat{h}_{D,m,m}\|^2.$$

Alternatively, a typical estimation method, e.g., a least square (LS) algorithm, may be used to perform the self-interference channel estimation at the digital domain, i.e., $\hat{h}_{D,m,m} = (A^H A)^{-1} A^H y_{m,res}$.

Thus, according to the full-duplex wireless communication method in the embodiments of the present disclosure, in the training period, the relevant parameter for cancelling the self-interference signal from the antenna itself is acquired as the first estimated value, and the relevant parameter for cancelling the cross-interference signal between the antenna and the other antenna is acquired as the second estimated value. Hence, the antenna device is able to cancel the self-interference signal and the cross-interference signal in accordance with the first estimated value and the second estimated value within a data transmission period. In addition, the antenna device is able to receive and transmit signals simultaneously using an identical frequency, thereby enabling the full-duplex wireless communication system to double its spatial diversity gains and data throughput, and to improve the performance of the full-duplex wireless communication system.

Figure 5:
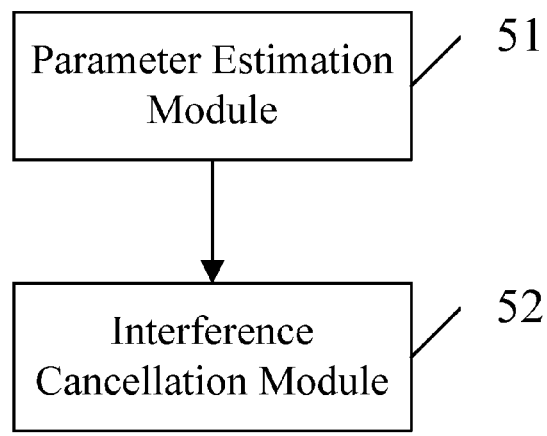
FIG. 5 is a schematic view showing an antenna device according to one embodiment of the present disclosure.

As shown in FIG. 5, the present disclosure further provides in one embodiment an antenna device, which includes:

a parameter estimation module 51 configured to, within the training period, acquire the relevant parameter for cancelling the self-interference signal from the antenna itself as the first estimated value, and the relevant parameter for cancelling the cross-interference signal between the antenna and the other antenna as the second estimated value; and an interference cancellation module configured to, within the data transmission period, cancel the self-interference signal from the antenna itself in accordance with the first estimated value and cancel the cross-interference signal between the antenna and the other antenna in accordance with the second estimated value when signals are received and transmitted simultaneously by the antenna using an identical frequency.

To be specific, the parameter estimation module 51 includes:

a training sequence transmission and reception module configured to, in one of a plurality of training slots within the training period, transmit the predetermined training sequence by the antenna itself and receive the predetermined training sequence from the antenna itself, and receive, in the other training slots, receive the predetermined training sequence from the other antenna; and a parameter estimation sub-module configured to, in the training slot, acquire the relevant parameter for cancelling the self-interference signal from the antenna itself as the first estimated value in accordance with the predetermined training sequence from the antenna itself, and in the other training slots, acquire the relevant parameter for cancelling the cross-interference signal between the antenna and the other antenna as the second estimated value in accordance with the predetermined training sequence from the other antenna.

To be specific, the parameter estimation sub-module includes:

a first analog estimation unit configured to, in the training slot, perform estimation on the channel parameter of the self-interference signal at an analog domain in accordance with the predetermined training sequence from the antenna itself so as to obtain the first analog estimated value, thereby canceling the self-interference signal from the antenna itself at the analog domain in accordance with the first analog estimated value; and a first digital estimation unit configured to, in the training slot, perform estimation on the channel parameter of the residual self-interference signal at the digital domain in accordance with the residual self-interference signal from the antenna obtained after the analog-domain cancellation so as to obtain the first digital estimated value, thereby canceling the residual self-interference signal from the antenna at the digital domain in accordance with the first digital estimated value.

To be specific, the parameter estimation sub-module further includes:

a second analog estimation unit configured to, in the other training slots, perform estimation on the channel parameter of the cross-interference signal between the antenna and the other antenna at the analog domain in accordance with the predetermined training sequence from the other antenna so as to obtain the second analog estimated value, thereby canceling the cross-interference signal between the antenna and the other antenna at the analog domain in accordance with the second analog estimated value; and a second digital estimation unit configured to, in the other training slots, performing estimation on the channel parameter of the residual cross-interference signal between the antenna and the other antenna at the digital domain in accordance with the residual cross-interference signal between the antenna and the other antenna obtained after the analog cancellation so as to obtain the second digital estimated value, thereby canceling the residual cross-interference signal between the antenna and the other antenna at the digital domain in accordance with the second digital estimated value.

To be specific, the sequence transmission and reception module includes a sequence transmission sub-module configured to, in the training slot, transmit the predetermined training sequence periodically.

The parameter estimation sub-module includes:

an estimation unit configured to perform estimation on the channel parameter of the self-interference signal from the antenna itself in accordance with the predetermined training sequence so as to obtain a plurality of first candidate estimated values, and performing estimation on the channel parameter of the cross-interference signal between the antenna and the other antenna in accordance with the predetermined training sequence so as to obtain a plurality of second candidate estimated values; and a selection unit configured to select an estimated value capable of enabling the energy of the residual self-interference signal to be minimum from the plurality of first candidate estimated values as the first estimated value, and select an estimated value capable of enabling the energy of the residual cross-interference signal to be minimum from the plurality of second candidate estimated values as the second estimated value.

To be specific, the interference cancellation module includes:

a first analog cancellation unit configured to, within the data transmission period, cancel the self-interference signal from the antenna itself at the analog domain in accordance with the first analog estimated value; and a first digital cancellation unit configured to cancel the residual self-interference signal from the antenna itself obtained after the analog-domain cancellation at the digital domain in accordance with the first digital estimated value.

To be specific, the interference cancellation module further includes:

a second analog cancellation unit configured to, within the data transmission period, cancel the cross-interference signal between the antenna and the other antenna at the analog domain in accordance with the second analog estimated value; and a second digital cancellation unit configured to cancel the residual cross-interference signal between the antenna and the other antenna obtained after the analog-domain cancellation at the digital domain in accordance with the second digital estimated value.

To be specific, the antenna device further includes:

an inversion module configured to, within the training period, invert a phase of an analog signal of the predetermined training sequence from the antenna, so as to obtain an interference cancellation signal with a phase reverse to the analog signal;

an acquisition module configured to acquire an interference signal generated by the predetermined training sequence from the antenna itself;

a power comparison module configured to compare power of the interference cancellation signal and power of the interference signal, and adjust the power of the interference cancellation signal in accordance with a comparison result, so as to enable a difference between the power of the interference cancellation signal and the power of the interference signal to be minimum; and a phase comparison module configured to add the interference cancellation signal to the interference signal, and adjust the phase of the interference cancellation signal in accordance with an addition result, so as to enable the phase of the interference cancellation signal to be reverse to the phase of the interference signal and enable signal power obtained after the addition to approximate to be zero, thereby to perform the interference cancellation at the analog domain.

To be specific, an optimal value is determined, through negative feedback control, from the plurality of candidate estimated values as the first estimated value or the second estimated value, and the optimal value is an estimated value capable of enabling the signal power obtained after the addition to be minimum.

It should be appreciated that, the antenna device in the embodiments of the present disclosure can be used to implement the above-mentioned full-duplex wireless communication method, so the above embodiments concerning the full-duplex wireless communication method may also be adapted to the antenna device, resulting in an identical or similar effect.

The present disclosure further provides in one embodiment a full-duplex wireless communication system including N antenna devices described above, and N is an integer greater than or equal to 1.

It should be appreciated that, when N=1, the full-duplex wireless communication system is a single antenna-based system in which the antenna receives and transmits the signals simultaneously using an identical frequency. The antenna merely receives the self-interference signal from the antenna itself, so it is merely required to acquire the first estimated value within the training period. Correspondingly, within the data transmission period, it is merely required to cancel the self-interference signal in accordance with the first estimated value. The full-duplex wireless communication system where N is greater than 1 will be described hereinafter.

Figure 6:
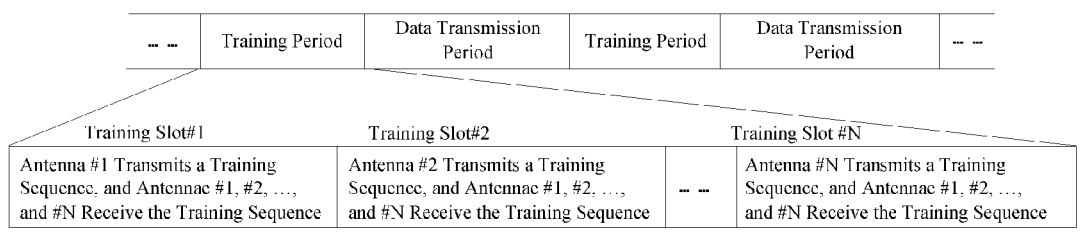
FIG. 6 is a schematic view showing slots for a full-duplex wireless communication system according to one embodiment of the present disclosure.

As shown in FIG. 6, the data transmission procedure for the full-duplex wireless communication system may include the training period and the data transmission period.

When there are N antennae, each training period of the system may be divided into N slots. In each slot, one and only one antenna serves as a transmitting antenna, and the other N−1 antennae serve as receiving antennae. The transmitting antenna may also receive the training sequence from the antenna itself. For ease of description, the transmitting antenna is referred to as the "primary antenna", and the receiving antennae are referred to as "secondary antennae". Correspondingly, a slot for an antenna when it serves as the primary antenna is referred to as a "primary slot" for the antenna, and the other slots are referred to as "secondary slots" for the antenna.

Within each training period, each antenna may serve as the primary antenna or a secondary antenna. When it serves as the primary antenna, it may receive and transmit the training sequence simultaneously, and when it serves as a secondary antenna, it may merely receive the training sequence from the primary antenna. Alternatively, each training period consists of N slots, and each antenna is chosen as the primary antenna in a Round-Robin manner. Each antenna has one and only one chance to be chosen as the primary antenna which may receive and transmit the training sequence simultaneously in the primary slot and which may serve as a secondary antenna in the other slots. In other words, in each training slot, one and only one antenna is chosen as the primary antenna and the other N−1 antennae are chosen as secondary antennae.

In one training slot, when the primary antenna is used to transmit data, the secondary antennae may merely receive the data from the primary antenna. The primary antenna performs the estimation on the relevant parameter for cancelling the self-interference signal (the signal from the antenna itself) and performs the initial self-interference cancellation. Meanwhile, the secondary antennae are used to cancel the cross-interference signal induced by the primary antenna. In other words, the primary antenna performs the estimation on the relevant parameter for cancelling the self-interference signal and performs the initial self-interference cancellation in the primary slot, while the other antennae perform the estimation on the relevant parameter for cancelling the cross-interference signal and perform the cross-interference cancellation. Each antenna may, when it serves as the primary antenna, cancel the self-interference signal from the antenna itself, and when it serves as a secondary antenna, cancel the cross-interference signal.

For example, in a slot m (m≤N), antenna #m serves as the primary antenna for receiving and transmitting the training sequence simultaneously, and antenna #1, . . . , antenna #m−1, antenna #m+1, . . . , and antenna #N serve as the secondary antennae for merely receiving the training sequence from the primary antenna #m. Antenna #m performs the self-interference channel estimation to obtain the first estimated value, cancels the self-interference signal, and updates information on the self-interference channel. Antenna #1, . . . , antenna #m−1, antenna #m+1, . . . , and antenna #N may cancel the cross-interference signal induced by antenna #m. In other words, antenna #n (1≤n, and n≠m)) may estimate an interference channel $H_{n,m}$ (the second estimated value) between antenna #m and antenna #n, so as to cancel the cross-interference and update and store the parameters.

Within the data transmission period, all the antennae receive and transmit the signals simultaneously using an identical frequency. The first estimated value for cancelling the self-interference signal and the second estimated value for cancelling the cross-interference signal are invariable within the data transmission period, so each antenna may cancel the interference in accordance with the first estimated value and the second estimated value within the data transmission period.

It should be appreciated that, the modules, sub-modules and units included in the antenna device are provided on a function basis, and the structure of each antenna will be defined hereinafter on a hardware-implementation basis.

The functions of the above functional modules may be achieved through one hardware unit or a combination of hardware units.

Figure 7:
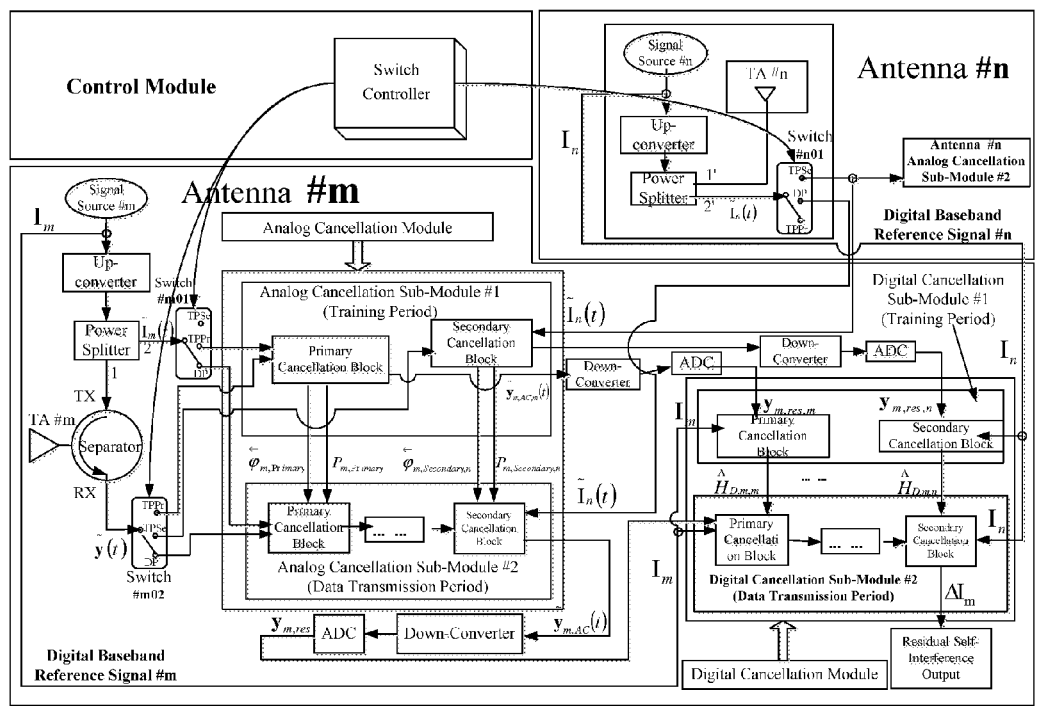
FIG. 7 is a schematic view showing the antennae of the full-duplex wireless communication system according to one embodiment of the present disclosure.

As shown in FIG. 7, in the full-duplex wireless communication system, each antenna includes an analog cancellation module and a digital cancellation module.

The analog cancellation module includes an analog cancellation sub-module #1 and an analog cancellation sub-module #2, and the digital cancellation module includes a digital cancellation sub-module #1 and a digital cancellation sub-module #2. For each module, the analog cancellation sub-module #1 or the digital cancellation sub-module #1 is used for the training period, while the analog cancellation sub-module #2 or the digital cancellation sub-module #2 is used for the data transmission period. Within the training period, the analog cancellation sub-module #1 and the digital cancellation sub-module #1 are both in an on state, while the analog cancellation sub-module #2 and the digital cancellation sub-module #2 are both in an off state. Each analog/digital cancellation sub-module #1 merely includes one "primary cancellation" block. When an antenna is the primary antenna, the primary cancellation block may perform estimation on the parameters of the self-interference signal induced when the antenna transmits the training sequence and perform the self-interference cancellation at the analog/digital domain. Each analog/digital cancellation sub-module #1 further includes N−1 "secondary cancellation" blocks. When the antenna is a secondary antenna, the secondary cancellation blocks may perform estimation on the parameters of the cross-interference signal between the antenna and the other antenna, and perform the cross-interference cancellation at the analog/digital domain. Each secondary cancellation block is used to cancel the cross-interference signal between the antenna and the corresponding one of the other N−1 antennae. For example, when antenna #m is a secondary antenna, the $n^{th}$ secondary cancellation block is enabled in a primary slot for antenna #n, so as to cancel the cross-interference signal between antenna #m and antenna #n.

The analog cancellation sub-module #2 and the digital cancellation sub-module #2 are both used for the self-interference cancellation within the data transmission period. The interference parameters have been initialized and some critical parameters (e.g., phase and power of the interference signal) have been estimated within the training period. In order to simplify the interference cancellation within the data transmission period, these parameters acquired within the training period may be directly used for the analog cancellation sub-module #2 and the digital cancellation sub-module #2 within the data transmission period. It should be appreciated that, an architecture of the analog/digital cancellation sub-module #2 is identical to that of the analog/digital cancellation sub-module #1, i.e., the analog/digital cancellation sub-module #2 merely includes one "primary cancellation" block for cancelling the self-interference in the RF or at the analog domain, and the other N−1 "secondary cancellation" blocks are used to cancel the cross-interference. In addition, the analog cancellation sub-module #1 is of a logic function identical to the analog cancellation sub-module #2, and the digital cancellation sub-module #1 is of a logic function identical to the digital cancellation sub-module #2, so the analog/digital cancellation sub-modules may be implemented by a separate functional circuit module, or may share an identical hardware circuit so as to reduce the system complexity and the hardware overhead. Further, the training period and the data transmission period do not exist simultaneously, so in the actual application, usually the analog cancellation sub-module #1 and the analog cancellation sub-module #2 may share an identical hardware circuit, and the digital cancellation sub-module #1 and the digital cancellation sub-module #2 may share an identical hardware circuit too.

In addition, each antenna includes at its receiver end two "switch controller" modules for controlling on and off states of each analog/digital cancellation module. As shown in FIG. 7, in antenna #m, switch #m01 and switch #m02 are both used to make a decision on a current slot (whether the current slot falls within the training period or the data transmission period). When the current slot falls within the training period, switch #m01 controls antenna #m to act as a primary antenna (i.e., the primary cancellation blocks of the analog cancellation sub-module #1 and the digital cancellation module #1 are enabled) or a secondary antenna (i.e., the secondary cancellation blocks of the analog cancellation sub-module #1 and the digital cancellation module #1 are enabled). When the current period is the data transmission, switch #m02 controls the analog cancellation sub-module #2 and the digital cancellation sub-module #2 to be enabled, so as to perform interference cancellation on the signal received by each antenna.

Based on the above, within the training period, merely the analog cancellation sub-module #1 and the digital cancellation sub-module #1 are activated, and each antenna performs at first initial estimation on the parameters for cancelling the interference. Within the data transmission period, once the analog cancellation sub-module #1 and the digital cancellation sub-module #1 both converge to a steady state, the estimated parameters (including phase and power of the self-interference signal) may be buffered and used for the analog cancellation sub-module #2 and the digital cancellation sub-module #2 within the data transmission period, so as to simplify the self-interference cancellation within the data transmission period. Because the self-interference channel parameters are invariable within both the training period and the data transmission period, it is unnecessary to perform the complex parameter estimation within the data transmission period where all the antennae may receive and transmit the signals simultaneously using an identical frequency.

For example, in slot #m, antenna #m is chosen as the primary antenna, the primary cancellation block of the analog cancellation sub-module #1 is enabled, and a received RF signal $\tilde{y}(t)$ is processed by antenna #m. Antenna #m may estimate phase $\overleftarrow{\varphi}_{m,Primary}$ and power $P_{m,Primary}$ of the self-interference signal in accordance with the reference signal, and then the self-interference may be preliminarily cancelled in accordance with the estimated parameters (phase and power). In addition, $\overleftarrow{\varphi}_{m,Primary}$ and $P_{m,Primary}$ estimated in the training period may be transmitted to the primary cancellation block of the analog cancellation sub-module #2, so as to enable the antenna to cancel the self-interference signal within the data transmission period. Next, an outputted RF signal $\tilde{y}_{m,Ac,m}(t)$ is sent to the downconverter and the DAC and converted into a digital signal $y_{m,res,m}$, and this digital signal $y_{m,res,m}$ is processed, by the primary cancellation block of the digital cancellation sub-module #2. Hereinbefore, the self-interference channel result estimated by the digital cancellation sub-module #1 within the training period has been transmitted to the primary cancellation block of the digital cancellation sub-module #2, so as to enable the digital cancellation module #2 to cancel the self-interference signal at the digital domain within the data transmission period.

For another example, in slot #n, antenna #n is chosen as the primary antenna, antenna #m is chosen as the secondary antenna, and the secondary cancellation block of the analog cancellation sub-module #1 is enabled in antenna #m. Antenna #m may estimate parameters $\overleftarrow{\varphi}_{m,Secondary,n}$ and $P_{m,Secondary,n}$ in accordance with the cross-interference $\tilde{I}_n(t)$ between antenna #m and antenna #n, so as to cancel the cross-interference signal.

In order to describe the operating principle of the system in a better manner, the operating principles of the hardware units in the antenna will be described hereinafter.

Operating Principle and Working Flow of Primary Antenna within Training Period

Figure 8:
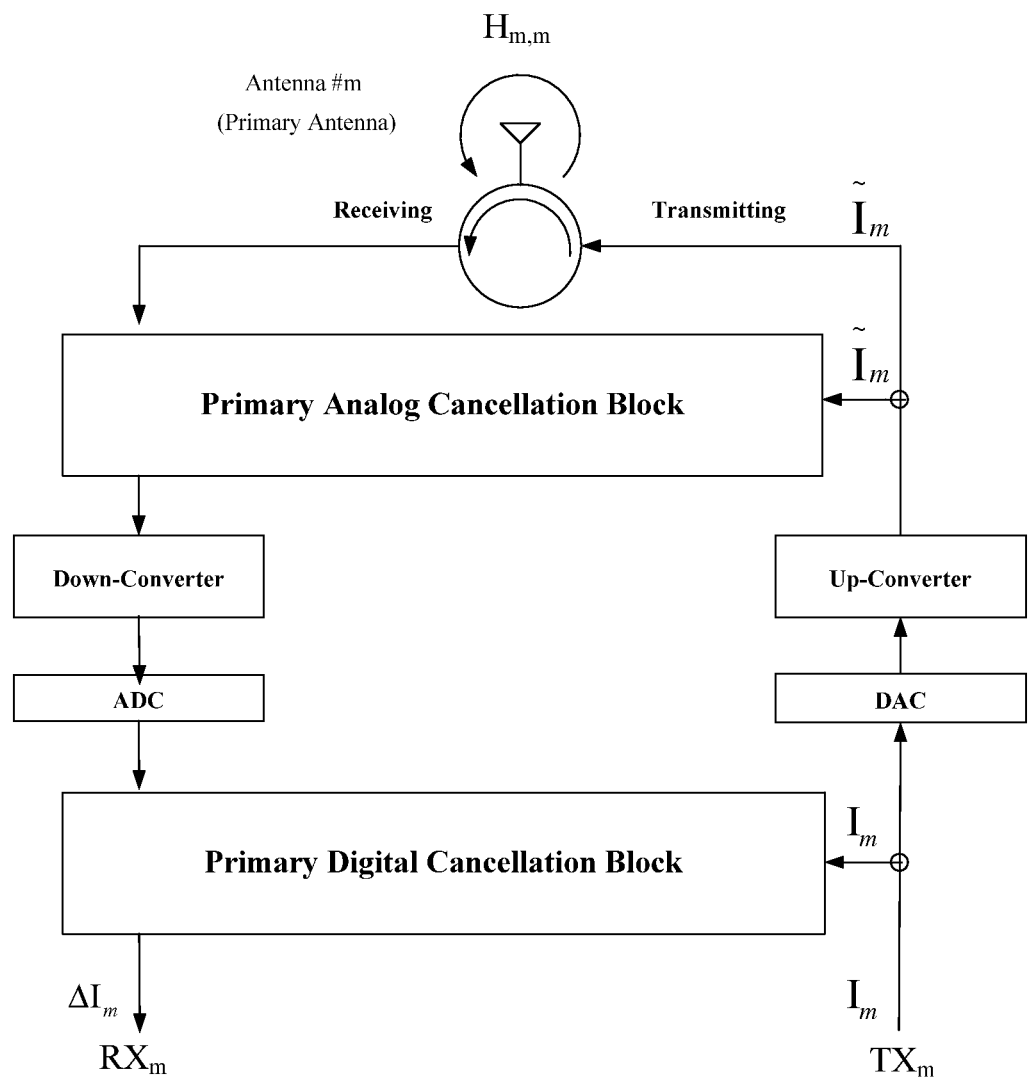
FIG. 8 is a schematic view showing an operating principle for a primary antenna of the full-duplex wireless communication system in a training period according to one embodiment of the present disclosure.

As shown in FIG. 8, in slot #m within each training period, antenna #m is chosen as the primary antenna which transmits and receives the training sequence simultaneously, while the other antennae are chosen as secondary antennae which merely receive the training sequence from the primary antenna. In slot #m, antenna #m (the primary antenna) merely activates the primary analog cancellation block and the primary digital cancellation block, performs estimation on the parameters for cancelling the self-interference signal in accordance with the training sequence from antenna #m itself, and cancels the self-interference signal. In slot #m, secondary analog cancellation block and the secondary digital cancellation block of antenna #m are both in the off state. Within the training period, the secondary antennae do not transmit the training sequence, so no interference is imposed by the secondary antennae onto the primary antenna.

Figure 9:
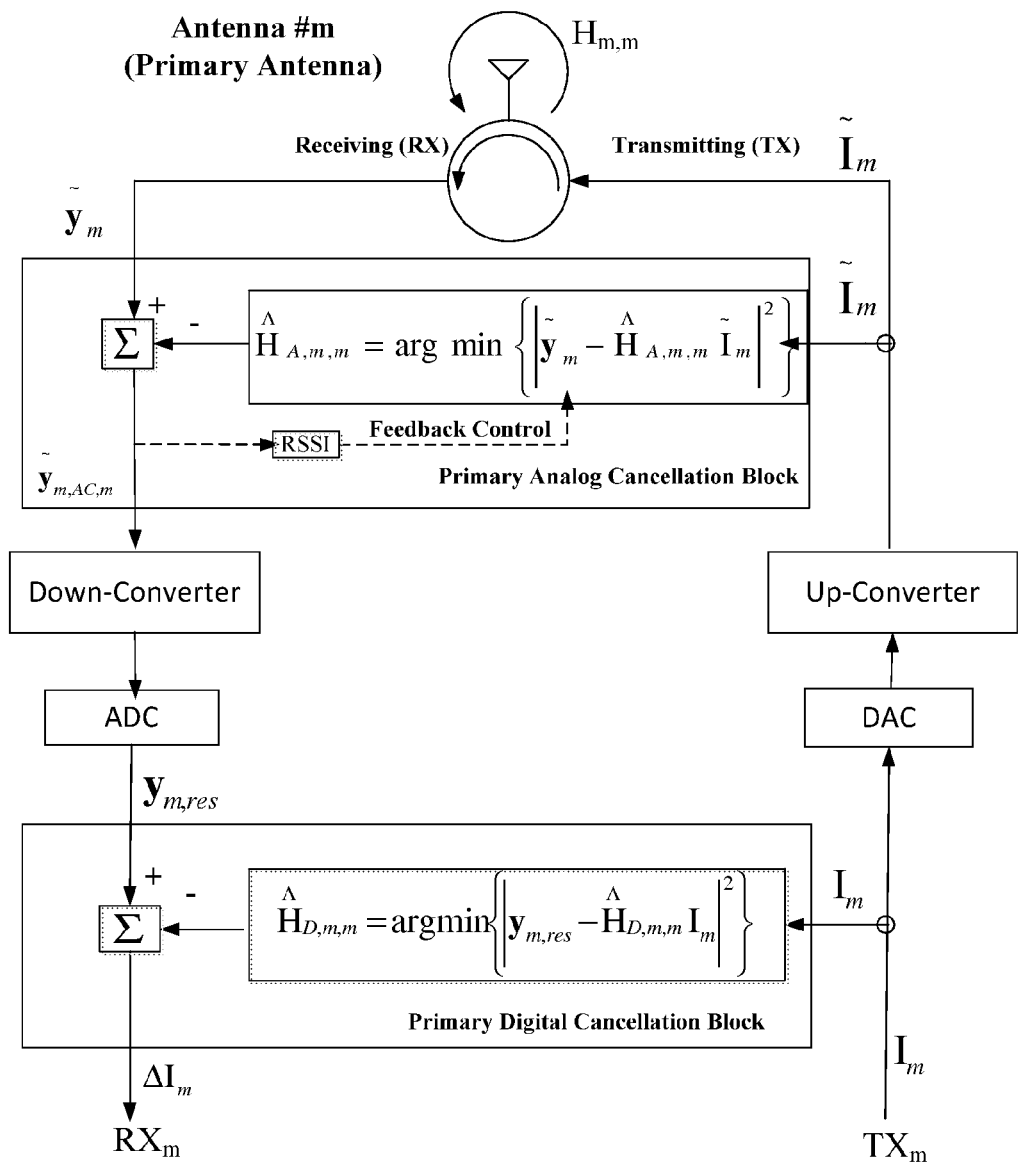
FIG. 9 is a schematic view showing a working flow for the primary antenna of the full-duplex wireless communication system in the training period according to one embodiment of the present disclosure.

As shown in FIG. 9, when antenna #m is chosen as the primary antenna, it may transmit an analog signal of the training sequence $I_m$ as the reference signal so as to perform the self-interference cancellation. On a receiving link of antenna #m, $I_m$ is transmitted to the DAC and an up-converter so as to obtain an analog signal $\tilde{I}_m$. Then, the analog signal $\tilde{I}_m$ is transmitted through a self-interference channel $H_{m,m}$ and received by the receiving link of antenna #m. Hence, a separator (e.g., a circulator) may be used in each primary antenna so as to attenuate the self-interference signal. Then, the attenuated self-interference signal $\tilde{y}_m$ is transmitted to the primary analog cancellation block so as to cancel the residual self-interference signal. A coefficient $\hat{H}_{A,m,m}$ may be adaptively adjusted so as to minimize the sum power $|\tilde{y}_m - \hat{H}_{A,m,m}*\tilde{I}_m|^2$, i.e., to calculate an optimal value of $\hat{H}_{A,m,m}$ using the equation $\hat{H}_{A,m,m}=\arg\min\{|\tilde{y}_m - \hat{H}_{A,m,m}*\tilde{I}_m|^2\}$. In this way, quite a part of the self-interference induced by antenna #m may be canceled. In the equation, $\tilde{y}_m = H_{m,m}*\tilde{I}_m$, $H_{m,m}$ represents an attenuation coefficient for the circulator, and $\tilde{I}_m$ represents an analog signal obtained after sending $I_m$ to the DAC and the up-converter.

After the self-interference cancellation performed by the primary analog cancellation block, the residual self-interference signal $\tilde{y}_{m,Ac,m}$ is sent to the down-converter and the ADC and converted into $y_{m,res}$, and then $y_{m,res}$ is processed by the digital cancellation sub-module #1 so as to further perform the self-interference cancellation at the digital domain. $\tilde{y}_{m,Ac,m}=(H_{m,m}-\hat{H}_{A,m,m})*\tilde{I}_m$, $H_{m,m}$ represents an attenuation coefficient for the circulator, $\tilde{I}_m$ represents an analog signal obtained after sending $I_m$ to the DAC and the up-converter, and $\hat{H}_{A,m,m}$ represents an estimated value of the self-interference channel parameter at the analog domain.

The self-interference channel parameter at the digital domain, $\hat{H}_{D,m,m}$, may be adaptively adjusted, so as to minimize $|y_{m,res}-\hat{H}_{D,m,m}*I_m|^2$, i.e., an optimal value of $\hat{H}_{D,m,m}$ may be calculated using the equation $\hat{H}_{D,m,m}=\arg\min\{|y_{m,res}-\hat{H}_{D,m,m}*I_m|^2\}$. In this way, the majority of the self-interference signal at the digital domain (i.e., $y_{m,res}$) may be cancelled.

The final residual self-interference signal is $\Delta I_m$, and $\Delta I_m = y_{m,res} - \hat{H}_{D,m,m}*I_m$, wherein $y_{m,res}$ represents the self-interference signal at the digital domain, $\hat{H}_{D,m,m}*I_m$ represents the signal cancelled at the digital domain, $\hat{H}_{D,m,m}$ represents an estimated value of the self-interference channel parameter at the digital domain, and $I_m$ represents the interference signal at the digital domain.

Operating Principle of Secondary Antenna within Training Period

Figure 10:
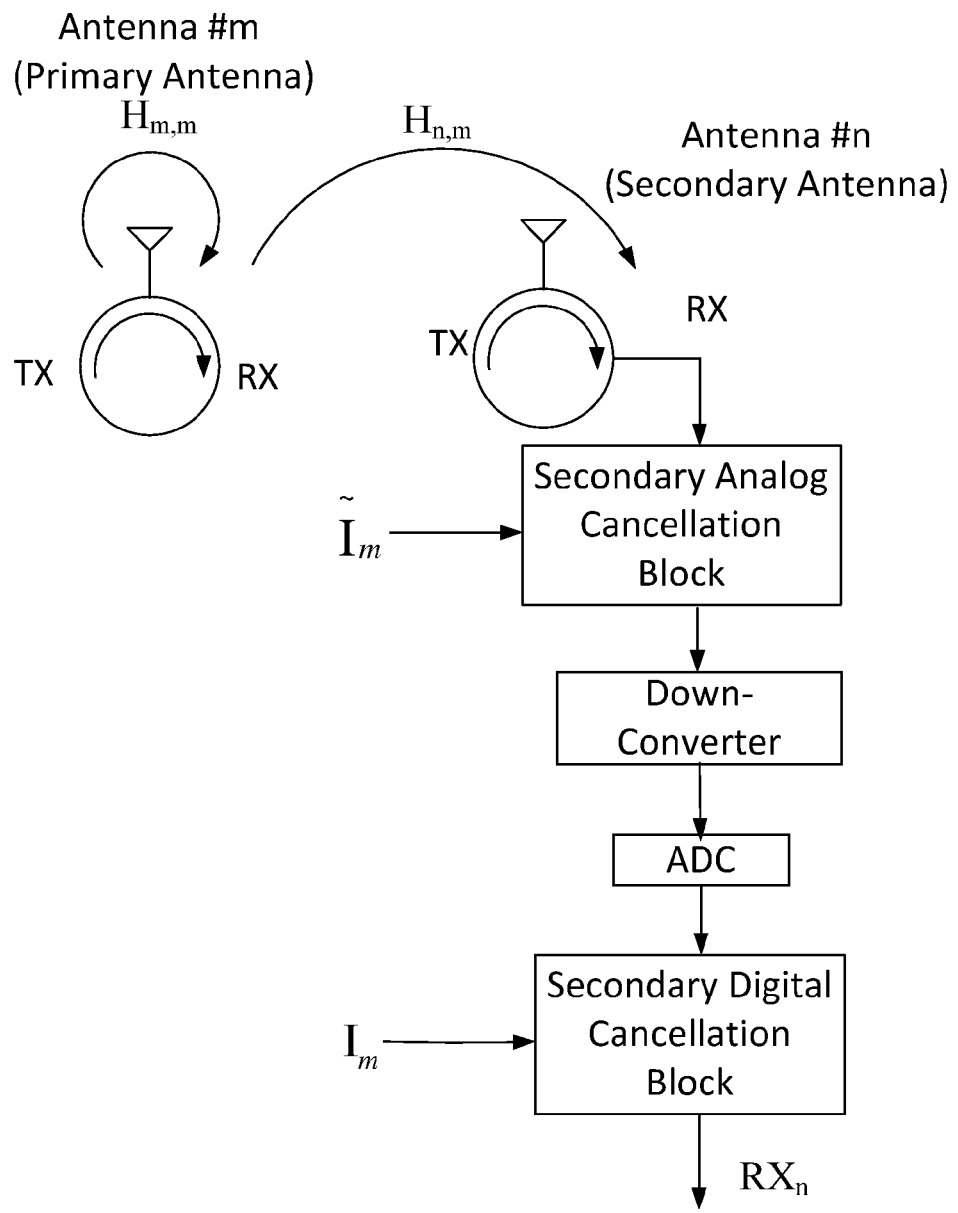
FIG. 10 is a schematic view showing an operating principle for a secondary antenna of the full-duplex wireless communication system in the training period according to one embodiment of the present disclosure.

As shown in FIG. 10, in slot #m within each training period, antenna #n (the secondary antenna) merely receives the training sequence. The training sequence transmitted by antenna #m (the primary antenna) are received by all the secondary antennae, and used by these secondary antennae as the reference signal to cancel the cross-interference signal. For each secondary antenna, both the primary analog cancellation block and the primary digital cancellation block are in the off state, and instead, the secondary analog cancellation block and the secondary digital cancellation block are enabled so as to cancel the cross-interference induced when the primary antenna transmits the training sequence. The training sequence received by the secondary antenna #n (i.e., the cross-interference signal) is sent to the secondary analog cancellation block of antenna #n, and the residual cross-interference signal is sent to the down-converter and the ADC and then cancelled at the digital domain by the secondary digital cancellation block.

It should be appreciated that, for the working flow of the secondary antenna within the training period, the estimation on the parameters for cancelling the cross-interference signal at the analog domain is identical to that on the parameters for cancelling the self-interference signal by the primary antenna at the analog domain, and the estimation on the channel parameters for cancelling the cross-interference signal at the digital domain is identical to that on the channel parameters for cancelling the self-interference signal by the primary antenna at the digital domain, thus they will not be repeated herein.

Operating Principle and Control Flow of Each Antenna within Training Period

Figure 11:
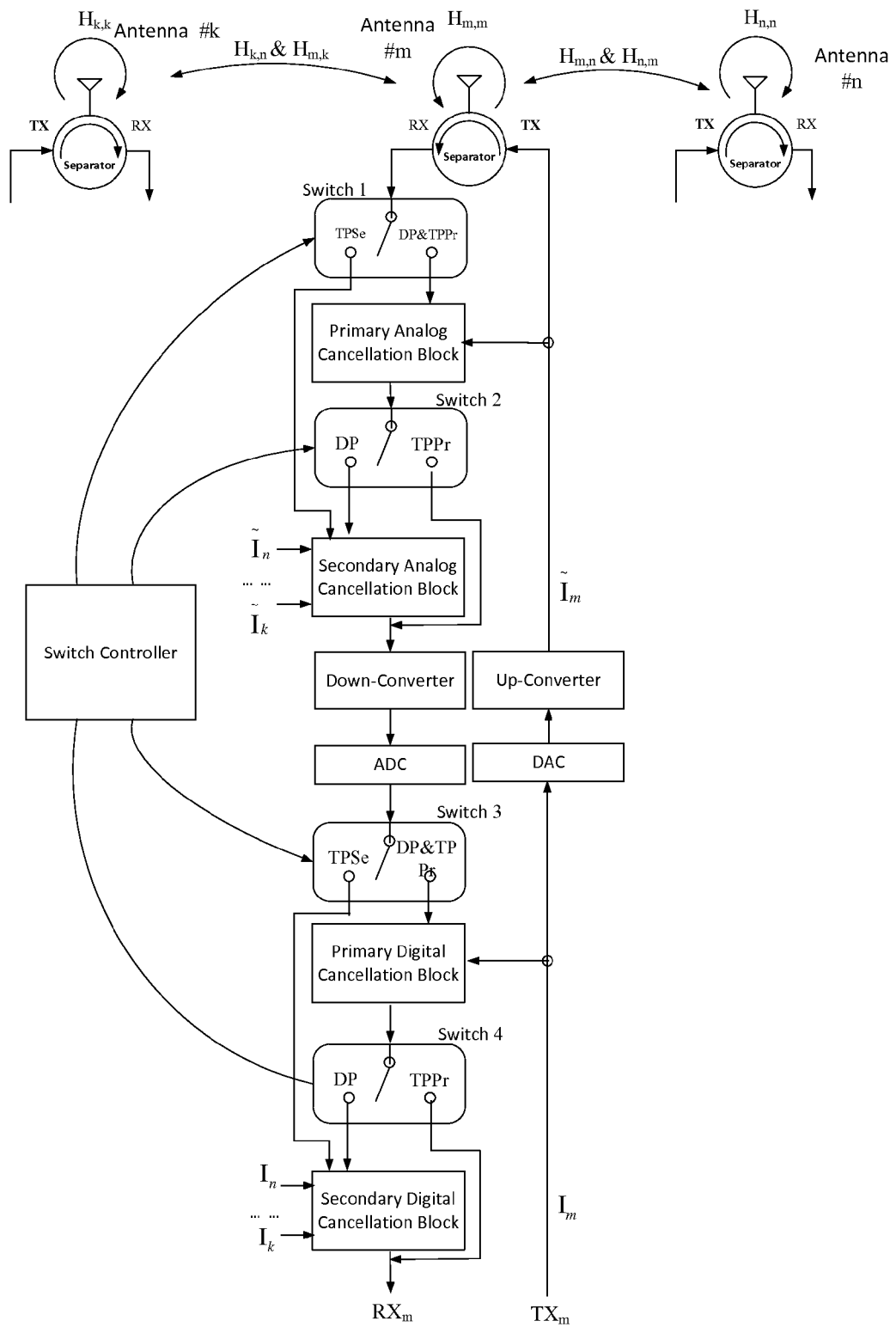
FIG. 11 is a schematic view showing an operating principle and a control flow for each antenna of the full-duplex wireless communication system in the training period according to one embodiment of the present disclosure.

As shown in FIG. 11, at each antenna side, two logic analog cancellation functional modules (i.e., the analog cancellation sub-module #1 and the analog cancellation sub-module #2) may share an identical physical circuit, so as to reduce the hardware complexity and cost. In this case, it is required to activate the two analog cancellation sub-modules within the training period and the data transmission period alternately. Identically, two logic digital cancellation functional modules may share an identical physical circuit, and they are required to be activated within the training period and the data transmission alternately.

Within the training period, merely the primary (secondary) analog/digital cancellation sub-module of the primary (secondary) antenna is activated. Within the data transmission period, each antenna may transmit and receive the signals simultaneously using an identical frequency, so the four interference cancellation sub-modules of each antenna may be activated simultaneously To be specific, a TPPr contact of the switch means that the antenna is the primary antenna in the current training slot, a TPSe contact means that the antenna is the secondary antenna in the current training slot, and a DP contact means that the antenna is within the data transmission period. For example, when an antenna is chosen as the primary antenna in the current slot within the training period, under the control of the switch controller, switch #1 is switched to the DP&TPPr contact, switch #2 is switched to the TPPr contact, switch #3 is switched to the DP&TPPr contact, and switch #4 is switched to the TPPr contact. For another example, when an antenna is chosen as the secondary antenna in the current slot within the training period, under the control of the switch controller, and switch #1 is switched to the TPSe contact, switch #3 is switched to the TPSe contact. At this time, the interference signal is not transmitted through switch #2 and switch #4, so it is unnecessary to control them. For yet another example, when an antenna is within the data transmission period, under the control of the switch controller, switch #1 is switched to the DP&TPPr contact, switch #2 is switched to the DP contact, switch #3 is switched to the DP&TPPr contact, and switch #4 is switched to the DP contact.

A working flow of the full-duplex wireless communication system with two antennae and a working flow of the full-duplex wireless communication system with three antennae will be described hereinafter briefly.

Figure 12:
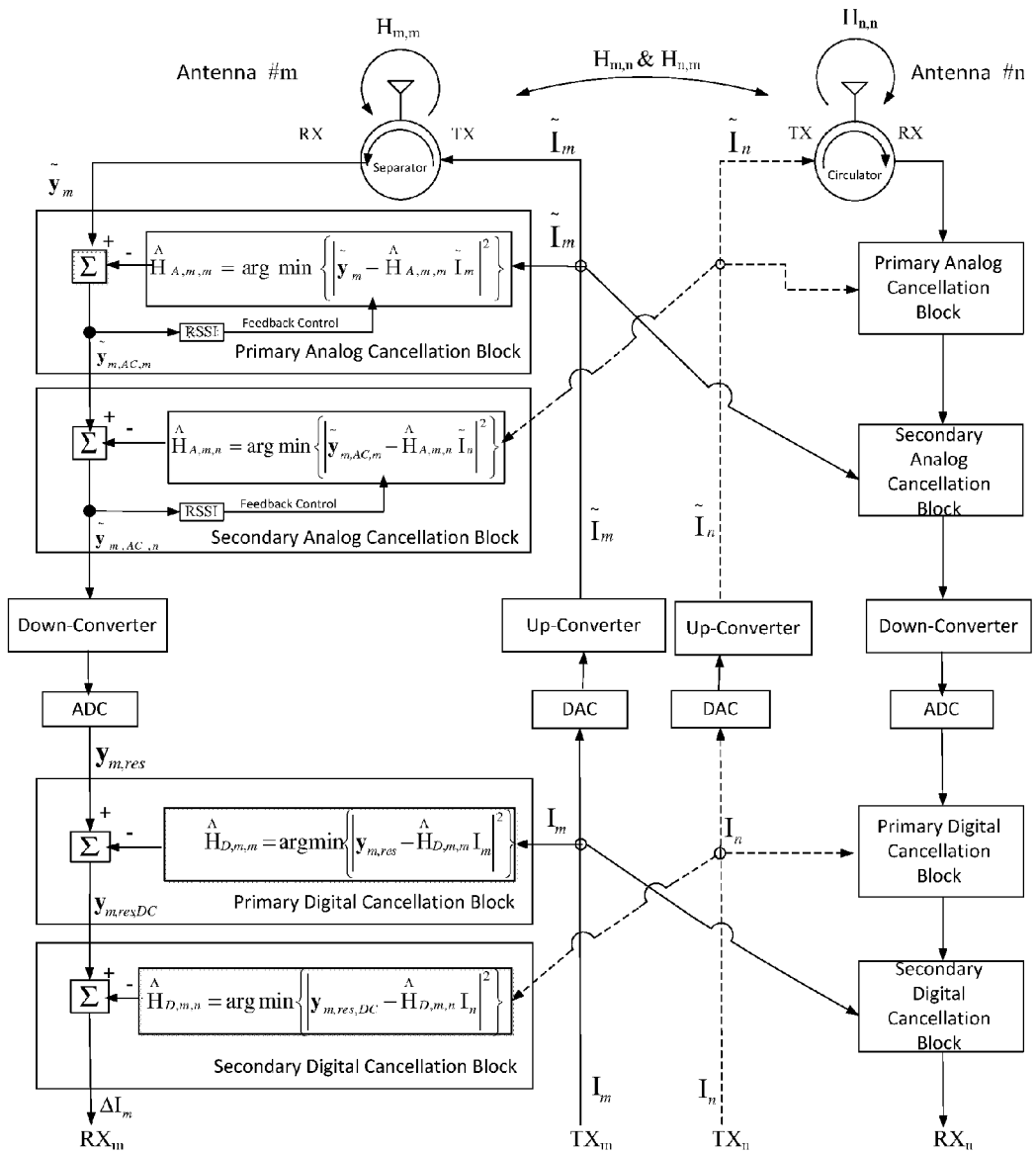
FIG. 12 is a schematic view showing an operating principle for the full-duplex wireless communication system with two antennae according to one embodiment of the present disclosure.

As shown in FIG. 12, for the full-duplex wireless communication system with two antennae, the two antennae are chosen as the primary antennae alternately in different training slots. In slot #m within each training period, antenna #m is chosen as the primary antenna that transmits and receives the training sequence simultaneously, while the other antenna is chosen as the secondary antenna that merely receives the training sequence. Within the data transmission period, all the four interference cancellation sub-modules (the analog cancellation sub-module #1, the digital cancellation sub-module #1, the analog cancellation sub-module #2 and the digital cancellation sub-module #2) of each antenna are activated so as to cancel the self-interference signal and the cross-interference signal. To be specific, the analog/digital cancellation sub-module is used to cancel the self-interference signal from the primary antenna at the analog/digital domain, and the secondary analog/digital cancellation sub-module is used to cancel the cross-interference signal between the antennae at the analog/digital domain. Within the data transmission period, two interference sources must be taken into consideration for each antenna, one induced by the data transmission from the antenna itself, and the other induced by the cross-interference between the two antennae. It should be appreciated that, for the system with two antennae, there exists the cross-interference between each antenna and the other antenna.

Figure 13:
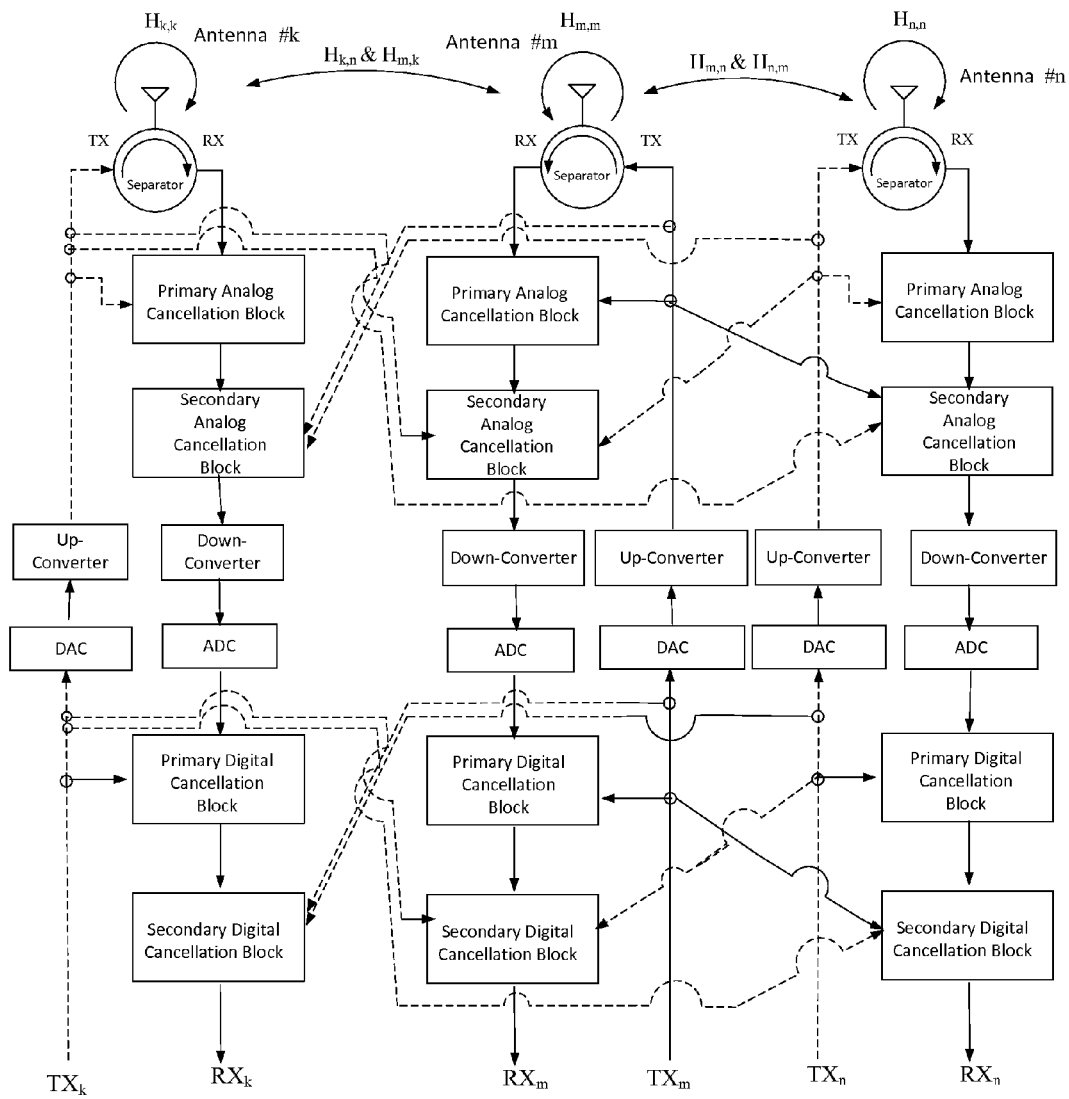
FIG. 13 is a schematic view showing an operating principle for the full-duplex wireless communication system with three antennae according to one embodiment of the present disclosure.

As shown in FIG. 13, for the full-duplex wireless communication system with three antennae, the three antennae are chosen as the primary antenna alternately in different training slots. In slot #m of each training period, antenna #m is chosen as the primary antenna that transmits and receives the training sequence simultaneously, while the other two antennae are chosen as the secondary antennae that merely receive the training sequence. Within the data transmission period, all the four interference cancellation sub-modules of each antenna (i.e., the analog cancellation sub-module #1, the digital cancellation sub-module #1, the analog cancellation sub-module #2 and the digital cancellation sub-module #2) are activated so as to cancel the self-interference signal from the primary antenna and the cross-interference signals between the primary antenna and the secondary antennae. To be specific, the primary analog/digital cancellation sub-module is used to cancel the self-interference signal from the primary antenna itself at the analog/digital domain, while the secondary analog/digital cancellation sub-module is used to cancel the cross-interference signals between the primary antenna and the secondary antennae. Within the data transmission period, each antenna may transmit and receive data simultaneously using an identical frequency. It should be appreciated that, for the system with three antennae, there exists the cross-interference between each antenna and the other two antennae, i.e., antenna #m may receive a self-interference signal from itself, a cross-interference signal between it and antenna #k, and a cross-interference signal between it and antenna #n, and so do antenna #n and antenna #k. The above situation may be directly extended to a scenario where N antennae (N>3) are included.

Thus, according to the full-duplex wireless communication system in the embodiments of the present disclosure, each antenna may transmit and receive the data simultaneously using an identical frequency, so it is able to remarkably improve the spectral efficiency as compared with a traditional half-duplex wireless communication system. In addition, as compared with the existing "antennae partition-based" full-duplex wireless communication system in which merely a part of the antennae is used to transmit data and the other part of the antennae is to receive data, the spatial diversity gains induced by the multiple antennae are not fully employed. However, the spatial diversity gains obtained by the full-duplex wireless communication system in the embodiments of the present disclosure are twice that of the existing "antennae partition-based" full-duplex wireless communication system. Further, the interference signals imposed onto the full-duplex wireless communication system may be cancelled effectively using a three-stage method (i.e., antenna attenuation, analog cancellation and digital cancellation).

To be specific, the data transmission procedure for the full-duplex wireless communication system in the embodiments of the present disclosure includes the training period and the data transmission period. In addition, depending on the number N of the antennae, the training period is further divided into N slots, in which each antenna is chosen as the primary antenna in a Round-Robin manner so as to calibrate its own self-interference cancellation parameter. Meanwhile, each secondary antenna also calibrates its cross-interference parameter in each slot. In this way, the initial self-interference channel estimation and pre-cancellation may be completed within the training period rapidly. Within the data transmission period, each antenna operates at a primary antenna mode so as to perform the estimation and cancellation on the self-interference signal and the cross-interference signal.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A full-duplex wireless communication method, comprising steps of:
    within a training period, acquiring a relevant parameter for cancelling a self-interference signal from an antenna itself as a first estimated value, and a relevant parameter for cancelling a cross-interference signal between the antenna and the other antenna as a second estimated value; and
    within a data transmission period, receiving and transmitting signals simultaneously by the antenna using an identical frequency, cancelling the self-interference signal from the antenna itself in accordance with the first estimated value, and cancelling the cross-interference signal between the antenna and the other antenna in accordance with the second estimated value, wherein the step of, within the training period, acquiring the relevant parameter for cancelling the self-interference signal from the antenna itself as the first estimated value, and the relevant parameter for cancelling the cross-interference signal between the antenna and the other antenna as the second estimated value comprises:

in one of a plurality of training slots within the training period, transmitting, by the antenna, a predetermined training sequence and receiving the predetermined training sequence transmitted by itself, and in the other training slots, receiving, by the antenna, a predetermined training sequence from the other antenna; and in the training slot, acquiring, by the antenna, the relevant parameter for cancelling the self-interference signal from the antenna itself as the first estimated value in accordance with the predetermined training sequence from the antenna itself, and within the other training slots, acquiring, by the antenna, the relevant parameter for cancelling the cross-interference signal between the antenna and the other antenna as the second estimated value in accordance with the predetermined training sequence from the other antenna;

wherein the step of, in the training slot, acquiring, by the antenna, the relevant parameter for cancelling the self-interference signal from the antenna itself as the first estimated value in accordance with the predetermined training sequence from the antenna itself comprises:

in the training slot, performing estimation, by the antenna, on a channel parameter of the self-interference signal at an analog domain in accordance with the predetermined training sequence from the antenna itself so as to obtain a first analog estimated value, and cancelling the self-interference signal from the antenna itself at the analog domain in accordance with the first analog estimated value; and in the training slot, performing estimation, by the antenna, on a channel parameter of a residual self-interference signal at a digital domain in accordance with the residual self-interference signal from the antenna obtained after the analog-domain cancellation so as to obtain a first digital estimated value, and cancelling the residual self-interference signal from the antenna at the digital domain in accordance with the first digital estimated value;

wherein the step of, in the other training slots, acquiring, by the antenna, the relevant parameter for cancelling the cross-interference signal between the antenna and the other antenna as the second estimated value in accordance with the predetermined training sequence from the other antenna comprises:

in the other training slots, performing estimation, by the antenna, on a channel parameter of the cross-interference signal between the antenna and the other antenna at the analog domain in accordance with the predetermined training sequence from the other antenna so as to obtain a second analog estimated value, and cancelling the cross-interference signal between the antenna and the other antenna at the analog domain in accordance with the second analog estimated value; and in the other training slots, performing estimation, by the antenna, on a channel parameter of a residual cross-interference signal between the antenna and the other antenna at the digital domain in accordance with a digital signal of the residual cross-interference signal between the antenna and the other antenna obtained after the analog cancellation so as to obtain a second digital estimated value, and cancelling the residual cross-interference signal between the antenna and the other antenna at the digital domain in accordance with the second digital estimated value.

2. The full-duplex wireless communication method according to claim 1, further comprising steps of:

in the training slot, transmitting, by the antenna, the predetermined training sequence periodically;

performing estimation, by the antenna that receives the predetermined training sequence, on the channel parameter of the self-interference signal from the antenna itself in accordance with the predetermined training sequence so as to obtain a plurality of first candidate estimated values, and performing estimation on the channel parameter of the cross-interference signal between the antenna and the other antenna in accordance with the predetermined training sequence so as to obtain a plurality of second candidate estimated values; and selecting, by the antenna, an estimated value capable of enabling the energy of the residual self-interference signal to be minimum from the plurality of first candidate estimated values as the first estimated value, and selecting an estimated value capable of enabling the energy of the residual cross-interference signal to be minimum from the plurality of second candidate estimated values as the second estimated value.

3. The full-duplex wireless communication method according to claim 2, wherein an optimal value is determined, through negative feedback control, from the plurality of candidate estimated values as the first estimated value or the second estimated value, and the optimal value is an estimated value capable of enabling the signal power obtained after the addition to be minimum.

4. The full-duplex wireless communication method according to claim 1, wherein the step of cancelling, by the antenna, the self-interference signal from the antenna itself in accordance with the first estimated value comprises:

within the data transmission period, cancelling, by the antenna, the self-interference signal from the antenna itself at the analog domain in accordance with the first analog estimated value; and cancelling, by the antenna, the residual self-interference signal from the antenna itself obtained after the analog-domain cancellation at the digital domain in accordance with the first digital estimated value.

5. The full-duplex wireless communication method according to claim 4, wherein the step of cancelling, by the antenna, the cross-interference signal between the antenna and the other antenna in accordance with the second estimated value comprises:

within the data transmission period, cancelling, by the antenna, the cross-interference signal between the antenna and the other antenna at the analog domain in accordance with the second analog estimated value; and cancelling, by the antenna, the residual cross-interference signal between the antenna and the other antenna obtained after the analog-domain cancellation at the digital domain in accordance with the second digital estimated value.

6. The full-duplex wireless communication method according to claim 1, wherein in the training period, the cancellation step at the analog domain comprises:
   inverting a phase of an analog signal of the predetermined training sequence from an transmitting antenna, so as to obtain an interference cancellation signal with a phase reverse to the analog signal,
   acquiring an interference signal received by a receiving antenna and generated by the predetermined training sequence from the transmitting antenna;
   comparing power of the interference cancellation signal and power of the interference signal, and adjusting the power of the interference cancellation signal in accordance with a comparison result, so as to enable a difference between the power of the interference cancellation signal and the power of the interference signal to be minimum; and
   adding the interference cancellation signal to the interference signal, and adjusting the phase of the interference cancellation signal in accordance with an addition result, so as to enable the phase of the interference cancellation signal to be reverse to the phase of the interference signal and enable signal power obtained after the addition to approximate to be zero, thereby to perform the interference cancellation at the analog domain.

7. An antenna device, comprising:
   a parameter estimation circuit configured to, within a training period, acquire a relevant parameter for cancelling a self-interference signal from an antenna itself as a first estimated value, and a relevant parameter for cancelling a cross-interference signal between the antenna and the other antenna as a second estimated value; and
   an interference cancellation circuit configured to, within a data transmission period, cancel the self-interference signal from the antenna itself in accordance with the first estimated value and cancel the cross-interference signal between the antenna and the other antenna in accordance with the second estimated value when signals are received and transmitted simultaneously by the antenna using an identical frequency;
   wherein the parameter estimation circuit comprises:
   a training sequence transmission and reception circuit configured to, in one of a plurality of training slots within the training period, transmit a predetermined training sequence by the antenna itself and receive the predetermined training sequence from the antenna itself, and receive, in the other training slots, a predetermined training sequence from the other antenna; and
   a parameter estimation sub-circuit configured to, in the training slot, acquire the relevant parameter for cancelling the self-interference signal from the antenna itself as the first estimated value in accordance with the predetermined training sequence from the antenna itself, and in the other training slots, acquire the relevant parameter for cancelling the cross-interference signal between the antenna and the other antenna as the second estimated value in accordance with the predetermined training sequence from the other antenna;
   wherein the parameter estimation sub-circuit comprises:
   a first analog estimation unit configured to, in the training slot, perform estimation on a channel parameter of the self-interference signal at an analog domain in accordance with the predetermined training sequence from the antenna itself so as to obtain a first analog estimated value, thereby to cancel the self-interference signal from the antenna itself at the analog domain in accordance with the first analog estimated value; and
   a first digital estimation unit configured to, in the training slot, perform estimation on a channel parameter of a residual self-interference signal at a digital domain in accordance with the residual self-interference signal from the antenna obtained after the analog-domain cancellation so as to obtain a first digital estimated value, thereby to cancel the residual self-interference signal from the antenna at the digital domain in accordance with the first digital estimated value;
   wherein the parameter estimation sub-circuit further comprises:
   a second analog estimation unit configured to, in the other training slots, perform estimation on a channel parameter of the cross-interference signal between the antenna and the other antenna at the analog domain in accordance with the predetermined training sequence from the other antenna so as to obtain a second analog estimated value, thereby to cancel the cross-interference signal between the antenna and the other antenna at the analog domain in accordance with the second analog estimated value; and
   a second digital estimation unit configured to, in the other training slots, performing estimation on a residual cross-interference signal between the antenna and the other antenna at the digital domain in accordance with the residual cross-interference signal between the antenna and the other antenna obtained after the analog cancellation so as to obtain a second digital estimated value, thereby to cancel the residual cross-interference signal between the antenna and the other antenna at the digital domain in accordance with the second digital estimated value.

8. The antenna device according to claim 7, wherein the sequence transmission and reception circuit includes a sequence transmission sub-circuit configured to, in the training slot, transmit the predetermined training sequence periodically, and
   the parameter estimation sub-circuit comprises:
   an estimation unit configured to perform estimation on the channel parameter of the self-interference signal from the antenna itself in accordance with the predetermined training sequence so as to obtain a plurality of first candidate estimated values, and performing estimation on the channel parameter of the cross-interference signal between the antenna and the other antenna in accordance with the predetermined training sequence so as to obtain a plurality of second candidate estimated values; and
   a selection unit configured to select an estimated value capable of enabling the energy of the residual self-interference signal to be minimum from the plurality of first candidate estimated values as the first estimated value, and select an estimated value capable of enabling the energy of the residual cross-interference signal to be minimum from the plurality of second candidate estimated values as the second estimated value.

9. The antenna device according to claim 8, wherein an optimal value is determined, through negative feedback control, from the plurality of candidate estimated values as the first estimated value or the second estimated value, and the optimal value is an estimated value capable of enabling the signal power obtained after the addition to be minimum.

10. The antenna device according to claim 7, wherein the interference cancellation circuit comprises:

a first analog cancellation unit configured to, within the data transmission period, cancel the self-interference signal from the antenna itself at the analog domain in accordance with the first analog estimated value; and a first digital cancellation unit configured to cancel the residual self-interference signal from the antenna itself obtained after the analog-domain cancellation at the digital domain in accordance with the first digital estimated value.

11. The antenna device according to claim 10, wherein the interference cancellation circuit further comprises:

a second analog cancellation unit configured to, within the data transmission period, cancel the cross-interference signal between the antenna and the other antenna at the analog domain in accordance with the second analog estimated value; and a second digital cancellation unit configured to cancel the residual cross-interference signal between the antenna and the other antenna obtained after the analog-domain cancellation at the digital domain in accordance with the second digital estimated value.

12. The antenna device according to claim 7, further comprising:

an inversion circuit configured to, within the training period, invert a phase of an analog signal of the predetermined training sequence from the antenna, so as to obtain an interference cancellation signal with a phase reverse to the analog signal;

an acquisition circuit configured to acquire an interference signal generated by the predetermined training sequence;

a power comparison circuit configured to compare power of the interference cancellation signal and power of the interference signal, and adjust the power of the interference cancellation signal in accordance with a comparison result, so as to enable a difference between the power of the interference cancellation signal and the power of the interference signal to be minimum; and a phase comparison circuit configured to add the interference cancellation signal to the interference signal, and adjust the phase of the interference cancellation signal in accordance with an addition result, so as to enable the phase of the interference cancellation signal to be reverse to the phase of the interference signal and enable signal power obtained after the addition to approximate to be zero, thereby to perform the interference cancellation at the analog domain.

13. A full-duplex wireless communication system, comprising N antenna devices according claim 7, wherein N is an integer greater than or equal to 1.

* * * * *